US 6,718,333 B1

(12) United States Patent
Matsuda

(10) Patent No.: US 6,718,333 B1
(45) Date of Patent: Apr. 6, 2004

(54) STRUCTURED DOCUMENT CLASSIFICATION DEVICE, STRUCTURED DOCUMENT SEARCH SYSTEM, AND COMPUTER-READABLE MEMORY CAUSING A COMPUTER TO FUNCTION AS THE SAME

(75) Inventor: Katsushi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/352,351

(22) Filed: Jul. 13, 1999

(30) Foreign Application Priority Data

Jul. 15, 1998 (JP) .......................................... 10-200171

(51) Int. Cl.[7] .............................................. G06F 17/30
(52) U.S. Cl. ........................... 707/102; 707/100; 707/6
(58) Field of Search .............................. 707/7, 2, 5, 6, 707/500, 501, 513

(56) References Cited

U.S. PATENT DOCUMENTS

| 5,649,218 | A | * | 7/1997 | Saito | 715/513 |
|---|---|---|---|---|---|
| 5,794,236 | A | * | 8/1998 | Mehrle | 707/5 |
| 5,819,259 | A | * | 10/1998 | Duke-Moran et al. | 706/46 |
| 5,943,669 | A | * | 8/1999 | Numata | 707/5 |
| 5,991,709 | A | * | 11/1999 | Schoen | 704/1 |
| 6,067,539 | A | * | 5/2000 | Cohen | 707/2 |
| 6,192,360 | B1 | * | 2/2001 | Dumais et al. | 707/6 |
| 6,389,436 | B1 | * | 5/2002 | Chakrabarti et al. | 715/513 |

FOREIGN PATENT DOCUMENTS

| JP | H3-174653 | 7/1991 |
|---|---|---|
| JP | 7-225771 | 8/1995 |
| JP | 9-311869 | 12/1997 |
| JP | 10-124519 | 5/1998 |

OTHER PUBLICATIONS

Roy Tennant, Practical HTML A Self–Paced Tutorial, Library Solution Press, 1996, p. 16, 18, 23, 26, 64, 74, 83–84.*
Takahane, et al. "GIRLS: A Public–Domain Image Search System on the World Wide Web," Television Association Technical Reports, vol. 19, No. 61, 1995, pp. 1–8.
3. Tairago, Matsunaga, "Automatic Search of the WWW According to User Objectives," 55th Conference of the Data Processing Association (second Half of 1997) National Conference Proceedings, (3) pp. 154–155 (Sep. 24, 1997).
Hayashi, et al, Resource Discovery and Navigation on the WWW Information Space, Institute of Electronics, Information and Communication Engineers Technical Research Reprot (AI95–31), vol. 95, No. 265, 1995, pp. 71–78 (Sep. 28, 1995).

* cited by examiner

Primary Examiner—Kim Vu
Assistant Examiner—Joon Hwan Hwang
(74) Attorney, Agent, or Firm—Sughrue Mion, PLLC

(57) ABSTRACT

The present invention relates to a structured document classification device for classifying structured documents by types, comprising: a structural feature extracting section for extracting a structural feature or an incidental feature from each structured document; a structural feature rule base for storing a rule dedicated to the extracted structural feature or incidental feature; and a verifier for verifying each feature, which is extracted by the structural feature extracting section, according to the rule stored in the structured rule base, calculating relevance to each type.

22 Claims, 24 Drawing Sheets

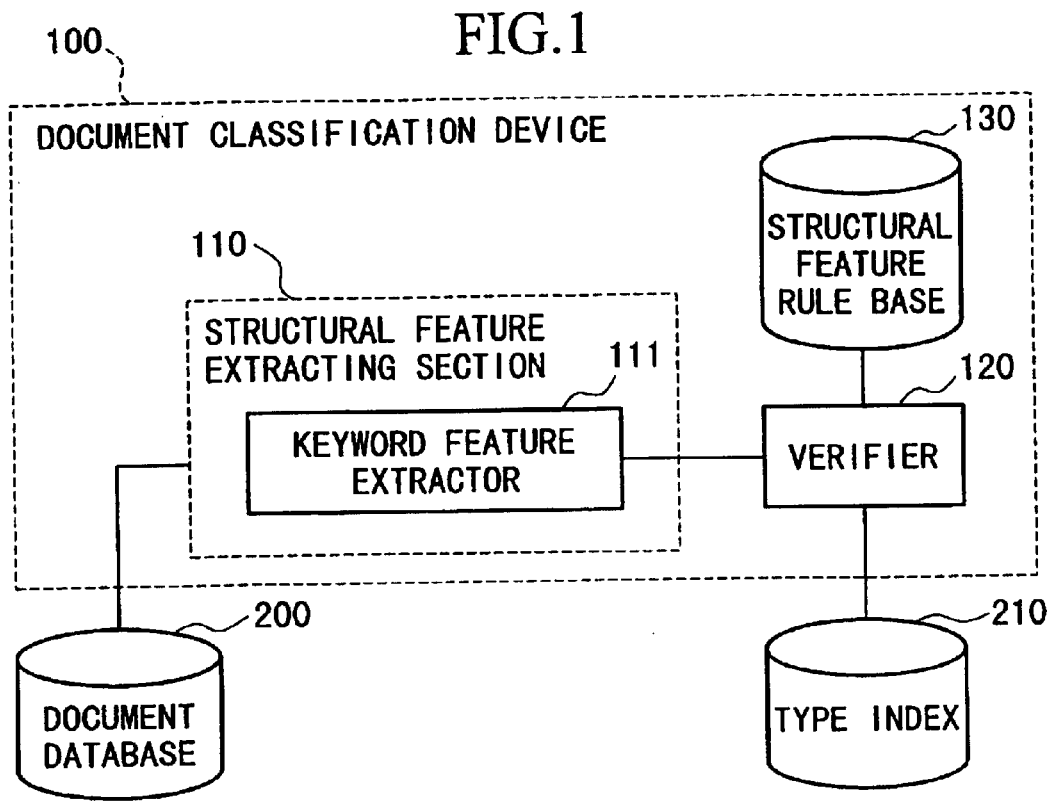
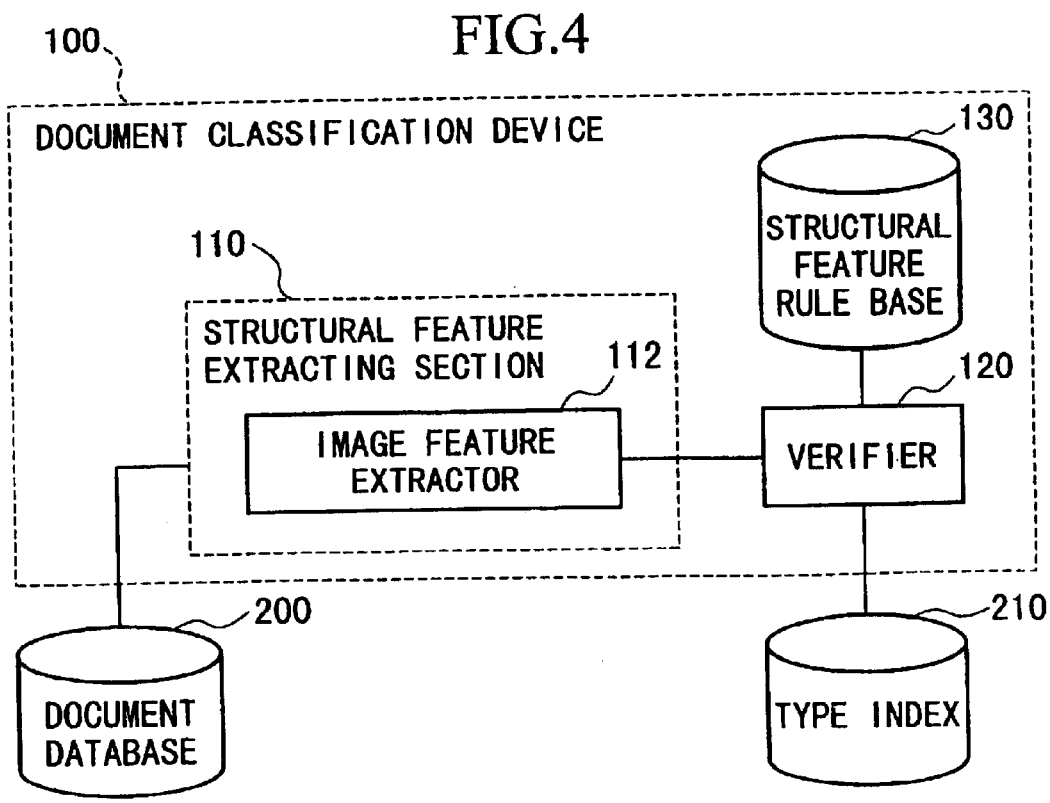

FIG. 2

```
<HTML>
<HEAD>
<TITLE>mobile X X (R series) </TITLE>
<map name="navi1">
        <area shape="rect" coords="555, -1, 647, 20" href="mk.htm">
        <area shape="rect" coords="467, 0, 553, 19" href="cs.htm">
</map>
<map name="navibanner1">
        <area shape="rect" coords= 507, 20, 558, 34" href="r_spec.htm">
        <area shape="rect" coords="372, 15, 455, 34" href="mk.htm">
        <area shape="rect" coords="189, 15, 270, 35" href="cs.htm">
        <area shape="rect" coords="87, 19, 146, 34" href="./">
</map>
</HEAD>
<BODY BGCOLOR="#FFFFFF" LINK="#0000BD" VLINK="#0063FF" ALINK="#000063">
<P>
<CENTER>
<IMG SRC="images/banner.gif" WIDTH="650" HEIGHT="20" usemap="#navi1"BORDER="0">
<IMG SRC="images/win2.gif" WIDTH="350" HEIGHT="60" ALT="With OO from ΔΔ Company" VSPACE="10">
<IMG SRC="images/r_tit.gif" WIDTH="263" HEIGHT="30" ALIGN="BOTTOM" BORDER="0" ALR="R SERIES">
<BR>

<FONT SIZE="2">
[<A HREF="#ekisho">Large keyboard & 640 X 240 dot large liquid crystal screen</A>]
[<A HREF="#sokudo">Greatly increased processing speed</A>]
[<A HREF="#ce20">With OO from ΔΔ Company"</A>]
[<A HREF="#sousasei">Greatly improved operability</A>]

Section omitted

<P>
<FONT SIZE="2" COLOR="#005555">
<B>
<A NAME="print">Printout function is standard equipment.</A>
</B>
</FONT>
<BR>
<FONT SIZE="2">
Allows printing via infrared interface or printer cable from applications such as Pocket Word, Pocket Excel and MG
Editor. X X fonts can be used for sharp printing.
</FONT>
</TD>
</TR>
</TABLE>
<P>
<BR>
<IMG SRC="images/navicon_2.gif" WIDTH="650" HEIGHT="40" usemap="#navibanner1" BORDER="0">
<P>
</CENTER>
</BODY>
</HTML>
```

FIG.3

```
keyword:product catalog:1:<img>:goods|service|product
keyword:product catalog:1:<body>:loading|possible|equipment
keyword:product catalog:1:<body>:Mr.|Mister|please
keyword:product catalog:2:<body>:inquiry|demand|request|communication|application|apply|appl.
keyword:product catalog:3:<body>:yen|price
keyword:product catalog:3:<h1>:specification|spec.

keyword:laboratory:4:<title>:lab|laboratory
keyword:laboratory:4:<h1>:lab|laboratory
keyword:laboratory:2:<h1>:Lab
keyword:laboratory:3:<h2>:staff|student
keyword:laboratory:4:<body>:professor|associate|assistant|technical official
keyword:laboratory:2:<body>:member|OB|graduate|constituent keyword:link collection:1:<body>:search|find
keyword:link collection:2:<body>:page|content|introduction
keyword:link collection:1:<body>:o|go
keyword:link collection:2:<body>:recomend|suggest
keyword:link collection:2:<body>:useful|convenient
keyword:link collection:3:<body>:link|start|server
keyword:link collection:2:<body>:collection
```

FIG. 5

```
<HTML>
<HEAD>
<TITLE>mobile X X (R series) </TITLE>

Section omitted

<CENTER>
<IMG SRC="images/banner.gif" WIDTH="650" HEIGHT="20" usemap="#navi1" BORDER="0">
<IMG SRC="images/win2.gif" WIDTH="350" HEIGHT="60" ALT="Comes with OO from X X Company"
VSPACE="10">
<IMG SRC="images/r_tit.gif" WIDTH="263" HEIGHT="30" ALIGN="BOTTOM" BORDER="0" ALT="R SERIES">
<BR>

Section omitted

<FONT SIZE="2">
[<A HREF="#ekisho">Large keyboard & 640 X 240 dot large liquid crystal screen</A>]
[<A HREF="#sokudo">Greatly improved processing speed</A>]
[<A HREF="#ce20">Comes with OO from ΔΔ Company"</A>]
[<A HREF="#sousasei">Greatly improved operability</A>]<BR>
[<A HREF="#pie">Includes 33.6kpbs modem and Pocket X X </A>]
[<A HREF="#lan">Supports PC-LAN mail</A>]
[<A HREF="#callback">Support callback functionality</A>]
[<A HREF="#ppp">Includes Pocket ΔΔ viewer</A>]<BR>
[<A HREF="#mgsoft">Original MG software</A>]
[<A HREF="#print">Includes printout functionality</A>]<BR>
[<A HREF="#apli2.htm">News delivery service</A>]
</FONT>
<P>
<TABLE BORDER="0" CELLPADDING="0" CELLSPACING="0" WIDTH="650">
<TR ALIGN="CENTER" VALIGN="BOTTOM">
<TD><IMG SRC="images/r500.gif" WIDTH="291" HEIGHT="266" ALT="MC-R500" VSPACE="8"></TD>
<TD><IMG SRC="images/r300.gif" WIDTH="287" HEIGHT="272" ALT="MC-R300" VSPACE="8"></TD>
</TR>
<TR ALIGN="CENTER" VALIGN="BOTTOM">
<TD><FONT SIZE="3">
<B>Vivid persuasive force. <BR>
Color model with OO from ΔΔ Company. </B><BR>
<B>MC-OO (color model)</B><BR>
List price 120,000 yen</FONT><FONT SIZE="2"> (excluding tax) </FONT><P></TD>
<TD><FONT SIZE="3"><B>30 hour long running time & 680 g portability. </B><BR>
<B>MC- ΔΔ (Monochrome model)</B><BR>
List price 94,000 yen</FONT><FONT SIZE="2"> (excluding tax) </FONT><P></TD>
</TR>
</TABLE>

Section omitted

</CENTER>
</BODY>
</HTML>
```

FIG.6

```
image:product catalog:5:over (30000) >=2
image:product catalog:1:over (30000) >=1 image:laboratory:2:over (50000) >=1
image:laboratory:4:ocr=laboratory
image:laboratory:3:ocr=labo image:link collection:4:under (7000) >=10
image:link collection:2:10>under (7000) >=5
```

```
<HTML> <HEAD><TITLE>◆OO Page◆</TITLE>
Section omitted
</HEAD>
Section omitted
<BODY background="back2.gif" TEXT=#000000 LINK=#0000FF>
Section omitted
<TABLE Border=3 Cellpadding=0 Cellspacing=1 bgcolor="#EEEEEE" WIDTH=560>
<TR><TH RowSpan=5 NoWrap>Word Cup</TH><TD ALIGN=center bgcolor=white NoWrap>
    <A HREF="http://www. X X .com/wcup/japan.html">World Cup Special</A></TD>
<TD> X X Sports page. Read World Cup highlights and articles showing the true face of the representatives.
</TD></TR>
<TR><TD ALIGN=center bgcolor=white>
    <A HREF="http://sports. ΔΔ.co.jp/soccer/wcup/"><BR>World Cup</A></TD>
<TD>Scoreboard page. Contains analysis of participating countries, introduction to the players, and related news.
</TD></TR>
<TR><TD ALIGN=center bgcolor=white>
    <A HREF="http://www.OO.co.jp/index.html">World Cup<BR>France Tournament</A></TD>
<TD>Able to read the latest news, World Cup guide and highlights. </TD></TR>
<TR><TD ALIGN=center bgcolor=white>
    <A HREF="http://www. X X X .com/wcup/">World Cup<BR>Today's news</A></TD>
<TD>Contains the latest news, participating country information, game schedules, etc. </TD></TR>
<TR><TD ALIGN=center bgcolor=white>Link Collection</TD>
<TD ALIGN=center bgcolor=white>
<A HREF="http://www. □ □.co.jp/wcup98.htm">Enjoy the World Cup on the Internet</A><BR>
<A HREF="http://www.ΔΔ.com/wcup.html">World-Cup Special</A><BR>
<A HREF="http://www.◎◎.co.jp/soccer.html"></A></TD></TR>
</TABLE><P><P>
Section omitted
<TABLE Border=1 Cellpadding=2 Cellspacing=0 bgcolor="#EEEEEE" WIDTH="560">
<TR bgcolor=#99CCFF><TD ColSpan=3><FONT Size=5 color=#000000><FONT Size=5 color=#FFFFCC>■</FONT>
General news</FONT></TD></TR>
<TR><TH ALIGN=center RowSpan=7 NoWrap>General news</TH>
<TD ALIGN=center bgcolor=white><A HREF="http://www. X X .com/index.html"> X X .com<BR>News
briefs</A><TD>
<TD>Online news from the X X newspaper.
Also has <A HREF="http://www. X X .com/index.html">morning edition</A> articles. </TD></TR>
<TR><TD ALIGN=center bgcolor=white><A HRER="http://web.OO.co.jp/">OO NET</A></TD>
<TD>Online news from the OO newspaper.
Technology-related news is under <A HREF="http://web.OO.co.jp/business/index.html">
news</A>. </TD></TR>
<TR><TD ALIGN=center bgcolor=white><A HREF="http://www.ΔΔ.co.jp/index.html">
X X <BR>Hot News</A></TD>
<TD>Online news from the □ □newspaper. You can also read headline news at
<A HREF="http://www. □ □.co.jp/frame/general.html">□ □</A>. </TD></TR>
</TABLE>
Section omitted
</BODY></HTML>
```

```
link:product catalog:2:internal>=3
link:product catalog:3:external<=2 link:laboratory:3:internal>=5
link:laboratory:2:external<=2 link:link collection:8:external>=20
link:link collection:4:20>external>=10
linl:link collection:2:internal>=5
```

FIG. 11

```
<HTML> <HEAD>
<TITLE>X X STAR</TITLE>
</HEAD>
<BODY BGCOLOR="#FFFFFF">
Section omitted
<H3><FONT COLOR="#0000FF">▌Specifications overview (Mini-tower)</FONT></H3>
Section omitted
<TABLE BORDER=1 WIDTH=100%>
<TR><TH COLSPAN=2 BGCOLOR=#E7E7E7>Category</TH><TH BGCOLOR=#E4CAFF>Specification</TH></TR>
Section omitted
<TR><TD ROWSPAN=2 BGCOLOR=#E7E7E7>Main RAM<BR> [Available]</TD>
<TD>32MB (SDRAM, installed in DIMM slot, user memory: 31.6MB)</TD></TR>
<TR><TD>Can be increased using add-on RAM sub-board (maximum 128MB<SUP><FONT SIZE=2
COLOR=#FF0000>*1</FONT></SUP>)<BR>
    [DIMM slot×2 (1 slot already has 32MB memory installed), SIMM slot×2<SUP>
       <FONT SIZE=2 COLOR+#FF0000>*3</FONT></SUP>] </TD></TR>
<TR><TD BGCOLOR=#E7E7E7>Video RAM</TD><TD>512KB(for text and graphics display), 2MB (for accelerator display)</TD></TR>
<TR><TD ROWSPAN=3 NOWRAP ALIGN=CENTER BGCOLOR=#E7E7E7>Dis<BR>play<BR>Func<BR>tions</TD>
    <TD BGCOLOR=#E7E7E7>Text display</TD><TD>English letters, numerals and kana: 80 characters × 25 lines/80 characters × 20
    lines; kanji: 40 characters × 25 lines/40 characters × 20 lines.
    <BR>Attributes can be set per character. <BR>Supports code refresh style text screen display independent of the graphics
    screen</TD></TR>
<TR><TD nowrap BGCOLOR=#E7E7E7>Graphics display</TD><TD>640×400 dots (16 colors), 640×400/480 dots (256 colors)<SUP>
    <FONT SIZE=2 COLOR=#FF0000>*3</FONT></SUP></TR>
<TR><TD BGCOLOR=#E7E7E7><FONT SIZE=-1>Window<BR>Accelerator<BR>-based graphics <BR>-based graphics <BR>display
    (built-in)</FONT></TD><TD>Comes with MGA=1064SG from Matrox Graphics Co.<BR>Includes video acceleration function)<BR>
    640×480 dots (256 colors/65,536 colors/16,770,000 colors)<BR>800×600 dots (256 colors/65,536 colors/16,770,000 colors)<BR>
    1,024×768 dots (256 colors/65,536 colors)<BR>1,280×1.24 dots (256 colors)</TD></TR>
<TR><TD ROWSPAN=6 NOWRAP ALIGN=CENTER BGCOLOR=#E7E7E7>S<BR>ou<BR>n<BR>d<BR>Func<BR>tions</TD>
    <TD BGCOLOR=#E7E7E7>POM recording<BR>playback function</TD><TD>Built-in (stereo, quantized 8-bit/16-bit, subling rate:
    11.025 kHZ/22.05KHz/44.1KHz/48KHz), <BR>Full duplex support (with monaural, quantized 8-bit)</TD></TR>
<TR><TD BGCOLOR=#E7E7E7>FM sound source function</TD><TD>Built-in (extended FM sound source (FM sound source max 20
    sounds)</TD></TR>
<TR><TD BGCOLOR=#E7E7E7>MIDI sound source function</TD><TD>Includes software synthesizer function (supports CS, CM
    performance mode)</TD></TR>
<TR><TD BGCOLOR=#E7E7E7>Speakers</TD><TD>External (stereo)</TD></TR>
<TR><TD BGCOLOR=#E7E7E7>Mic</TD><TD>External (monaural, unidirectional type)</TD></TR>
<TR><TD BGCOLOR=#E7E7E7>Surround</TD><TD>Enhanced stereo support</TD></TR>
<TR><TD ROWSPAN=2 NOWRAP ALIGN=CENTER BGCOLOR=#E7E7E7>In<BR>put<BR>dev<BR>ices</TD><TD
BGCOLOR=#E7E7E7> Keyboard</TD> <TD>Separate type, JIS standard layout (English letters and numerals, kana), includes ten-key,
15 function keys,<BR>Windows key and application keys</TD></TR>
<TR><TD BGCOLOR=#E7E7E7>Mouse</TD><TD>Comes standard with bus mouse</TD></TR>
<TR><TD ROWSPAN=3 NOWRAP ALIGN=CENTER BGCOLOR=#E7E7E7>Auxil<BR>iary<BR>stor<BR>age<BR>dev<BR>ices</TD>
    <TD BGCOLOR=#E7E7E7>Floppy<BR>disk</TD><TD>3.5 inch floppy disk drive (3-mode compatible)×1</TD></TR>
<TR><TD NOWRAP BGCOLOR=#E7E7E7>Hard disk</TD><TD>Internal (approx. 3.2GB)</TD></TR>
<TR VALGN="TOP"><TD BGCOLOR=#E7E7E7>CD-ROM</TD><TD>Internal (20x speed max (14x speed average))<SUP><FONT
    SIZE=2 COLOR=#FF0000>*4</FONT></SUP>, dedicated interface</TD></TR>
<TR><TD COLSPAN="2" BGCOLOR=#E7E7E7>Interfaces</TD><TD>Keyboard (mini-DIN 8-pin), mouse (mini-DIN 9-pin), <BR> Printer
    (parallel (half-pitch 36 pin)), <BR>Serial × 2 (D-sub 25-pin and D-sub 9-pin <SUP><FONT SIZE=2
    COLOR=#FF000>*5</FONT></SUP>), <BR>
    Display (analog RGB in, analog RGB out, mini D-sub 15-pin), <BR>USB
    <SUP><FONT SIZE=2 COLOR=#FF0000>*5</FONT></SUP>×2</TD></TR>
<TR><TD COLSPAN="2" BGCOLOR=#E7E7E7>Sound functions</TD><TD>Line input/output (stereo, mini jack), headphone output
    (stereo, mini jack), <BR>Mic input (monaural, mini jack), speaker output (stereo, mini jack), <BR>MIDI/JOYSTICK Interface × 1 (D-
    sub 15 pin)</TD></TR>
Section omitted
</TABLE>
Section omitted
</CENTER>
</BODY>
</HTML>
```

FIG.12

```
structure:product catalog:3:<table border=%1>:%1>=1
structure:product catalog:3:<sup>:%n=3
structure:product catalog:1:<sup>:%n<3
structure:product catalog:2:<select>:

structure:laboratory:1:<ul>:

structure:link collection:2:<table border=%1>:%1>=1
structure:link collection:5:<select>:%n>=5
structure:link collection:2:<table border=%1>:%1=0
```

FIG.14

```
url:product catalog:5:organization=co&path=product
url:product catalog:2:organization=co
url:product catalog:1:path=product url:laboratory:2:organization=ac url:url link collection:5:file=link
url:url link collection:3:path=link
url:url link collection:1:organization=or
url:url link collection:1:organization=ne
```

FIG. 16

```
<HTML><HEAD><TITLE>GAME INFORMATION</TITLE></HEAD>
<BODY BGCOLOR="#ffffff">
Section omitted
<HR><P>
<CENTER>
<OBJECT classid="cslid:D27CDB6E-AE6D-11cf-96B8-444553540000"
codebase="http://active.macromedia.com/flash/cabs/swflash.cab"
ID=index WIDTH=95% HEIGHT=95%>
  <PARAM NAME=movie VALUE="index.swf">
  <PARAM NAME=quality VALUE=high>
  <PARAM NAME=Play VALUE=true>
  <PARAM NAME=scale VALUE=showall>
<EMBED SRC="index.swf" WIDTH="95%" HEIGHT="95%"
 PLUGINSPACE="http://www.macromedia.com/shockwave/download/index.cgi?P1_Prod_Version=ShockwaveFlash"
 Play=true QUALITY=high scale=showall>
</EMBED>
</OBJECT>
</P></CENTER>
<HR>
<table>
<tr><td width=500>
  This page uses Shockwave Flash. To view this page, you need to have the newest version of Shockwave or Shockwave Flash plug-in.
<td><a href="http://www.macromedia.com/shockwave/download/"><img src="get_sw.gif"></a>
</table>
<HR>
Section omitted
</BODY>
</HTML>
```

FIG.17

```
plugin:game:3:type=swf
plugin:game:2:type=wav plugin:product catalog:2:type=avi
plugin:product catalog:5:type=pdf
plugin:product catalog:1:type=mov
plugin:product catalog:2:type=wrl plugin:personal page:3:type=swf
plugin:personal page:1:type=avi
plugin:personal page:2:type=mov
plugin:personal page:2:type=mid
```

FIG.19

```
keyword:product catalog:1:<img>:goods|service|product
keyword:product catalog:2:<body>:inquiry|demand|request|communication|application|apply|appl.
keyword:product catalog:3:<body>:yen|price
keyword:product catalog:3:<h1>:specification|spec.
image:product catalog:5:over(30000)>=2
link:product catalog:2:internal>=3
structure:product catalog:3:<table border=%1>:%1>=1
structure:product catalog:3:<sup>:%n>=3 keyword:laboratory:4:<title>:lab|laboratory
keyword:laboratory:3:<h2>:staff|student
keyword:laboratory:4:<body>:professor|associate|assistant|technical official
keyword:laboratory:2:<body>:member|OB|graduate|constituent
image:laboratory:4:ocr=laboratory
structure:laboratory:1:<ul>:

keyword:link collection:1:<body>:search|find
keyword:link collection:2:<body>:page|content|introduction
keyword:link collection:2:<body>:recomend|suggest
keyword:link collection:2:<body>:useful|convenient
keyword:link collection:3:<body>:link|start|server
image:link collection:4:under(7000)>=10
link:link collection:8:external>=20
strucuture:link collection:2:<table border=%1>:%1>=1
strucuture:link collection:5:<select>:%n>=5
```

FIG.21

```
relation:product catalog:5:up:keyword:<a>:specification|spec.
relation:product catalog:1:up:keyword:<body>:company|incorporated
relation:product catalog:4:down:structure:<table border=%1>:%1>=1
relation:product catalog:2:down:keyword:<table>:price
relation:product catalog:1:up:image:over (30000)>=2
relation:product catalog:1:down:image:over (30000)>=2 relation:laboratory:5:up:keyword:<a>:member|OB|graduate|constituent
relation:laboratory:2:down:structure:<ul>
relation:laboratory:1:down:link:internal>3 relation:link collection:3:down:keyword:<h1>:link
relation:link collection:3:down:structure:<table>
relation:link collection:2:down:link:external>=10
```

FIG.23

```
if 10>=(product catalog-personal page)>0 && personal page>=50 $$ product catalog<=90
then product catalog+=10 && personal page-=10 if 10>(personal page-product catalog)>0 && product catalog>=50 && personal page<=90
then personal page+=10 && product catalog-=10 if product catalog-laboratory>=30 && laboratory>0
then laboratory=0 if max<=30 && ave<=20
then max+=20 if 10>=(max-min)>=0 && ave<=20
then ave=0
```

FIG.25

| ID | PRODUCT CATALOG | LABORATORY | LINK COLLECTION | GAME | PERSONAL PAGE | COMMUNITY PAGE | GLOSSARY |
|---|---|---|---|---|---|---|---|
| 1 | 24 | 0 | 11 | 0 | 0 | 0 | 10 |
| 2 | 88 | 12 | 0 | 26 | 25 | 9 | 17 |
| 3 | 15 | 78 | 22 | 42 | 65 | 14 | 35 |
| 4 | 3 | 88 | 5 | 13 | 69 | 19 | 75 |
| 5 | 46 | 50 | 27 | 75 | 89 | 25 | 25 |
| 6 | 84 | 21 | 12 | 68 | 14 | 74 | 29 |
| 7 | 60 | 30 | 88 | 13 | 24 | 77 | 1 |
| 8 | 14 | 71 | 35 | 70 | 58 | 14 | 3 |
| 9 | 73 | 50 | 60 | 21 | 36 | 52 | 81 |
| 10 | 73 | 29 | 68 | 0 | 35 | 58 | 89 |
| 11 | 90 | 7 | 47 | 37 | 9 | 36 | 33 |
| 12 | 22 | 55 | 25 | 50 | 58 | 89 | 90 |
| 13 | 56 | 24 | 29 | 8 | 88 | 25 | 61 |
| 14 | 51 | 29 | 47 | 7 | 46 | 74 | 68 |
| 15 | 70 | 36 | 78 | 19 | 62 | 44 | 30 |
| 16 | 42 | 12 | 33 | 47 | 39 | 29 | 85 |
| 17 | 39 | 10 | 52 | 39 | 55 | 65 | 89 |

STRUCTURED DOCUMENT CLASSIFICATION DEVICE, STRUCTURED DOCUMENT SEARCH SYSTEM, AND COMPUTER-READABLE MEMORY CAUSING A COMPUTER TO FUNCTION AS THE SAME

BACKGROUND OF THE INVENTION

1. Field of the Invention

This invention relates to a structured document classification device, a structured document search system, and a computer-readable memory causing a computer to function as a structured document classification device and a structured document search system.

This application is based on Japanese Patent Application No. Hei 10200171, the contents of which are incorporated herein by reference.

2. Description of Related Art including information disclosed under 37 CFR 1.97 and 1.98.

One of the conventional processes for searching for a desired document in a database of structured documents, which is principally the WWW (World Wide Web), includes collecting published documents on the WWW by a robot, which is called "crawler", and converting the documents into the database to allow full-text retrieval. "Goo" (http://www.goo.ne.jp) is an example of the service providing this retrieval.

The database includes more than one million documents, and as the WWW further expands, the number of the documents will increase. Therefore, in response to a small number of keywords input by a user initiating a retrieval for a document, a great number of results are returned. The user must find a target document among a great number of results, which takes much time and labor. Therefore, the conventional retrieval processes are of little practical use.

A conventional process for performing retrieval using the structural features in structured documents, for example, of SGML (Standard Generalized Markup Language) is disclosed in Japanese Unexamined Patent Application, First Publication No. Hei 7-225771. This system prepares a retrieval expression which includes the structural features of the structured documents, and enables a precise retrieval when the type of a retrieval target document (for example, a patent document, a study, or a specification) is clear.

The conventional system of Japanese Unexamined Patent Application, First Publication No. Hei 7-225771, can perform an accurate retrieval by specifying a target document in the SGML document database by keyword and type of the target document, but is not applicable to the structured documents (HTML: Hypertext Markup Language) on the WWW whose structure is not clearer than that of the SGML.

Further, because the process of Japanese Unexamined Patent Application, First Publication No. Hei 7-225771 requires examples of the structured documents, the conventional process is not applicable to the WWW.

Further, Japanese Unexamined Patent Application, First Publication No. Hei 9-311869 discloses a search server which, in response to an input of search parameters, searches for a target information from a number of URLs. Japanese Unexamined Patent Application, First Publication No. Hei 10-124519 discloses an information display device which automatically arrange keywords in a hierarchical structure.

SUMMARY OF THE INVENTION

It is therefore an object of the present invention to provide a structured document classification device which enhances the accuracy of a search and reduces the labor of a searcher searching for a target document by classifying the target HTML documents according to types beforehand.

In one aspect of the present invention, the structured document classification device for classifying structured documents by types, comprises: a structural feature extracting section for extracting a structural feature or an incidental feature from each structured document; a structural feature rule base for storing a rule dedicated to the extracted structural feature or incidental feature; and a verifier for verifying each feature, which is extracted by the structural feature extracting section, according to the rule stored in the structured rule base, calculating relevance to each type.

The structural feature extracting section includes a keyword feature extractor for extracting a tag and keyword pair from each structured document. The structural feature extracting section may include a image file feature extractor for extracting a feature of an image file from each structured document. The structural feature extracting section may include a link feature extractor for extracting a feature of a link from each structured document. The structural feature extracting section may include a tag structural feature extractor for extracting a feature of a tag structure from each structured document. The structural feature extracting section may include a URL feature extractor for extracting a feature of URL information from each structured document. The structural feature extracting section may include a plugin feature extractor for extracting a feature of a plugin from each structured document. The structural feature extracting section may include an upper-lower level feature extractor for extracting structural features of an upper level document and of a lower level document from each structured document. Further, the structural feature extracting section may extract any combination of features of a tag and keyword pair, an image file, a link, a tag structure, URL information, and a plugin.

The structured document classification device of the present invention further comprises: a score controller for controlling the relevance of each structured document according to a control rule which finely controls the relevance in consideration of relationships between the types and of the context as a whole.

In another aspect of the present invention, the structured document search system using the structured document classification device, comprises: a input/output device for inputting a search parameter and a type of a target structured document and for outputting search results; a search engine for performing a search in a database storing structured documents by the input search parameter; a type searcher for searching for the relevance to the input type found by the search engine, the relevance being calculated by the structured document classification device; and a restrictor for receiving the search results from the search engine, receiving the relevance of the structured document found by the type searcher, restricting the search results by consulting the relevance to the input type, and outputting the narrowed search results to the input/output device.

Instead of the restrictor, the system may have a separator for receiving the search results from the search engine, receiving the relevance of the structured document found by the type searcher, grouping the found documents according to their relevance to the input type, and outputting the search results to the input/output device.

The first advantage of the present invention is that the classification of the structured documents, for example, HTML documents, is made accurate because this invention extracts the features of a tag and keyword pair, an image file, a link information, a tag structure, URL information, a plugin information, any combination of these, or upper and lower level documents.

The second advantage of the present invention is that the classification is made consistent because this invention finely controls the search results in consideration of the relationships between the groups in the classification and the context as a whole.

The third advantage of the present invention is that a target HTML document can be found efficiently, because this invention calculates the relevance to the types accurately beforehand and narrows the search results based on the relevance, or because this invention calculates the relevance to the types accurately beforehand and displays the search results by groups.

BRIEF DESCRIPTION OF THE DRAWINGS

FIG. 1 is a block diagram of the first embodiment of the present invention.

FIG. 2 is a diagram showing an example of an HTML document for the first embodiment of the present invention.

FIG. 3 is a diagram showing an example of a rule for the first embodiment of the present invention.

FIG. 4 is a block diagram of the second embodiment of the present invention.

FIG. 5 is a diagram showing an example of an HTML document for the second embodiment of the present invention.

FIG. 6 is a diagram showing an example of a rule for the second embodiment of the present invention.

FIG. 8 is a diagram showing an example of an HTML document for the third embodiment of the present invention.

FIG. 9 is a diagram showing an example of a rule for the third embodiment of the present invention.

FIG. 11 is a diagram showing an example of an HTML document for the fourth embodiment of the present invention.

FIG. 12 is a diagram showing an example of a rule for the fourth embodiment of the present invention.

FIG. 14 is a diagram showing an example of a rule for the fifth embodiment of the present invention.

FIG. 16 is a diagram showing an example of an HTML document for the sixth embodiment of the present invention.

FIG. 17 is a diagram showing an example of a rule for the sixth embodiment.

FIG. 19 is a diagram showing an example of a rule for the seventh embodiment of the present invention.

FIG. 21 is a diagram showing an example of a rule for the eight embodiment of the present invention.

FIG. 23 is a diagram showing an example of a rule for the ninth embodiment.

FIG. 25 is a table showing a list in the database in the tenth embodiment of the present invention.

DETAILED DESCRIPTION OF THE PREFERRED EMBODIMENTS

[First Embodiment]

Figure 7:
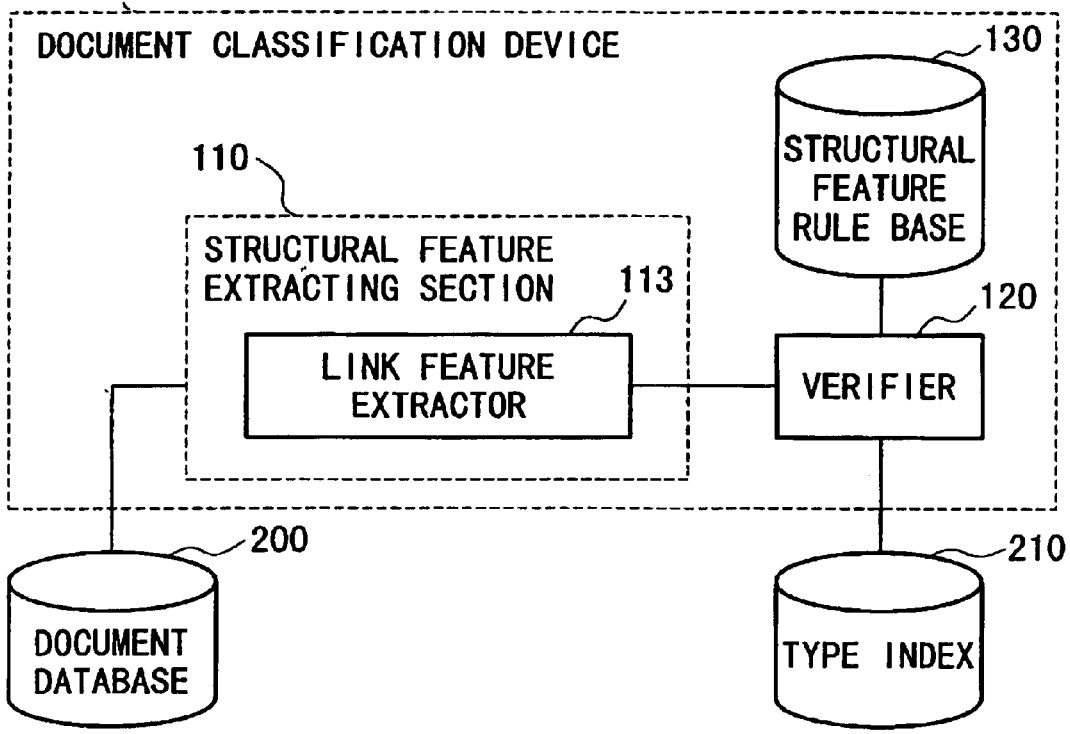
FIG. 7 is a block diagram showing the third embodiment of the present invention.

The first embodiment of the present invention will be explained with reference to the Figures.

Referring to FIG. 1, the first embodiment includes a document database 200 for storing HTML document data, a document classifier 100 controlled by a computer program, and a type index 210 for storing the types of the HTML documents generated from the document classifier 100.

The document classifier 100 includes a structural feature extracting section 110 which includes a keyword feature extractor 111 for extracting features by a tag and keyword pair in the HTML document, a structural feature rule base 130 for scoring the points of the extracted structural features, and a verifier 120 for verifying the structural features according to the rules and adding the score to obtain the relevance to the HTML document.

The operation of the first embodiment will now be explained with reference to FIG. 1.

The document classifier 100 extracts one HTML document at a time from the document database 200 storing the HTML document data, and inputs the HTML documents to the structural feature extracting section 110. The structural feature extracting section 110 starts the keyword feature extractor 111, extracts a tag and keyword pair from the HTML document, and send them to the verifier 120. The structural feature rule base 130 stores a rule which defines conditions and scores for each type of document. The verifier 120 verifies the features, which are sent from the structural feature extracting section 110, according to the rules of the structural feature rule base 130. The verifier adds the corresponding scores described by the rule, and obtains the relevance to each type of document. The verifier stores the obtained results in the type index 210.

According to the first embodiment, the structural feature extracting section extracts a tag and keyword pair from the HTML document and determines the type of the document, allowing more detailed classification than that by the conventional process using only keyword information.

The operation of the first embodiment will now be described in greater detail, by way of example.

The document database 200 stores the HTML documents which a robot automatically collects from the Internet. The save format may be a database format or a file format in a file system.

FIG. 2 shows an example of the HTML document stored in the document database 200. The type of the HTML document is "product catalog".

The structural feature rule base 130 includes the rule shown in FIG. 3.

The rule, forms, and scores shown in FIG. 3 are only examples, the present invention is not limited to this.

The meaning of the rule of FIG. 3 will be explained. The forms are marked off by colons (:). In this example, the basic form of the rule is "keyword: type: score: tag: keyword list."

The first item in this style is a label indicating that the rule matches the keyword feature extractor. The second item indicates that the rule is particular to the type of the document. The third item indicates the score to be added when the type of the document is verified. The fourth item indicates a tag which includes the keyword. The fifth item is a list of keywords in the tag.

For example, when the tag <h1> includes keywords "specification" or "spec." with the tag <h1>, the rule "keyword: product catalog: 3: <h1>: specification | spec." adds three for the type of "product catalog". FIG. 3 describes the rules for "product catalog", "laboratory", and "link collection".

The structural feature extracting section 110 starts the keyword feature extractor 111, extracts tag and keyword pairs from the HTML document, and sends them to the verifier 120. The keyword feature extractor 111 extracts the tag and keyword pair of the HTML document.

Specifically, for the underlined portion ("equipment") in the HTML document of FIG. 2, "<HTML><BODY><CENTER><FONT><B><A>standard</A></B></FONT></CENTER></BODY></HTML>" is extracted. This pair structure is an example, and the feature structure may employ a tree structure in which the branches correspond to the tags and the leaves correspond to the keywords. The form of the feature is not limited to the first embodiment. Further, the first embodiment extracts only keywords, but it may also extract phrases (such as "is", or "is/are").

The verifier 120 verifies the features, which are sent from the structural feature extracting section 110, according to the rules of the structural feature rule base 130. One of the rules in FIG. 3, "keyword: product catalog: 1: <body>: loading | possible | equipment", is used to verify the features extracted by the keyword feature extractor 111. That is, the verifier finds the tag of the fourth item in the rule from the tag and keyword pair structure, and finds the keyword "standard" in the same pair structure. Thus, the verification according to the rule is successful, and the score defined in the rule is added to obtain the relevance to the type of the HTML document (the product catalog in this example).

When the HTML document of FIG. 2 is verified according to the rules for three types in FIG. 3 ("product catalog", "laboratory", and "link collection"), only the above rule matches the HTML document. As the result, "product catalog" scores one point, "laboratory" scores zero points, and "link collection" scores zero points. Because the middle part of the HTML document is omitted, the points of "product catalog" through the entire document may in fact be higher.

If all the verifications according to the rules for the types in the structural feature rule base 130 are successful, the verifier 120 scores a full mark, which is defined as 100%. The verifier 120 outputs the relevance to each type. According to the rules shown in FIG. 3, the full mark of "product catalog" is at 11 points, the full mark of "laboratory" is at 19 points, and the full mark of "link collection" is at 13 points. Therefore, the relevance to "product catalog" is 9% (1/11× 100), the relevance to "laboratory" is 0% (0/19×100), and the relevance to "link collection" is 0% (0/13×100). This calculation process is an example, is not limited to this embodiment, and may include averaging weights for the points of types.

The verifier 120 writes the results of the relevance in the type index 210. The type index 210 stores the relevances to the types as they are, or may attach flags which are turned on for the type of the highest relevance and which are turned off for the other types.

[Second Embodiment]

The second embodiment of the present invention will now be explained with reference to Figures.

Referring to FIG. 4, as compared with the first embodiment, the second embodiment includes an image feature extractor 112, which is provided in the structural feature extracting section 110, for extracting an image feature from the HTML documents, instead of the keyword feature extractor 111.

The operation of the second embodiment will be explained with reference to FIG. 4.

In a manner similar to the first embodiment, the HTML document is input to the structural feature extracting section 110. The structural feature extracting section 110 starts the image feature extractor 112, extracts image files from the HTML document, and sends the image files to the verifier 120. The structural feature rule base 130 stores a rule which defines conditions and scores for each type of document.

The verifier 120 verifies the features, which are sent from the structural feature extracting section 110, according to the rules in the structural feature rule base 130. The verifier 120 adds the scores described in the rule, and obtains relevance of the document to each type. The calculated results are stored in the type index 210.

According to the present invention, the structural feature extracting section extracts the image file from the HTML document and determines the type of the document, allowing more detailed classification than that by the conventional process using only keyword information.

The operation of the second embodiment will now be described in greater detail, by way of example.

Except for the structural feature extracting section 110, the second embodiment is identical to the first embodiment, and therefore mainly the structural feature extracting section and the structural feature rule base 130 are described in the following.

FIG. 5 shows the middle part of the HTML document which is omitted in FIG. 2. The type of the HTML document is "product catalog".

The structural feature rule base 130 includes the rule shown in FIG. 6. The basic form of this rule is "image: type: score: conditional expression." The first item is a label indicating that the rule matches the feature extractor. The second item indicates a type of the rule, and the third item indicates a score. The fourth item indicates a conditional expression for an image file.

The rule "image: product catalog: 5: over(30000)>=2" means adding five points to the score of the type "product catalog" when the HTML document includes more than two images, each of which is more than 30000 bytes (=30 kilobytes). FIG. 6 describes the rules of the three types for "product catalog", "laboratory", and "link collection."

The structural feature extracting section 110 starts the image feature extractor 112, extracts image files from the HTML document, and sends the features of the image files to the verifier 120.

For example, in the HTML document shown in FIG. 5, the byte sizes, the sizes of the images, and the formats are extracted from the image files of the five underlined portions (banner.gif, win2.gif, $r_{13}$ tit.gif, r500.gif, and r300.gif). If necessary, the images may be read by an OCR (Optical Character Reader), and the extracted character strings may be sent to the verifier. In FIG. 6, the rule "image: laboratory: 4: ocr=laboratory" matches the character strings read by the OCR, and means adding four points when the character string "laboratory" is extracted after the process of the OCR.

The verifier 120 verifies the features, which are sent from the structural feature extracting section 110, according to the rules in the structural feature rule base 130. In the HTML document of FIG. 5, the byte sizes of the five image files are 7722 bytes, 4490 bytes, 1947 bytes, 47804 bytes, and 56573 bytes, respectively. Then, the verification according to the rule in FIG. 6 "image: product catalog: 5: over (30000)>=2" is successful. According to the calculation process similar to the first embodiment, "product catalog" scores five points, "laboratory" scores two points, and "link collection" scores zero points. The relevance to "product catalog" is 83% (5/6×100), the relevance to "laboratory" is 22% (2/9×100), and the relevance to "link collection" is 0% (0/6×100).

[Third Embodiment]

The third embodiment of the present invention will be explained.

Referring to FIG. 7, as compared with the first embodiment, the third embodiment includes a link feature extractor 113, provided in a structural feature extracting section 110, for extracting a link feature from the HTML document, instead of the keyword feature extractor 111.

In a manner similar to the first embodiment, the HTML document is input to the structural feature extracting section 110. The structural feature extracting section 110 starts the link feature extractor 113, extracts link features from the HTML document, and sends the link features to the verifier 120. The structural feature rule base 130 stores a rule which defines conditions and scores for each type of document.

The verifier 120 verifies the features, which are sent from the structural feature extracting section 110, according to the rules in the structural feature rule base 130. The verifier adds the scores described in the rule, and obtains the relevance of the document to each type. The verifier stores the calculation results in the type index 210.

According to the third embodiment, the structural feature extracting section extracts the link information from the HTML document and determines the type of the document, allowing more detailed classification than that by the conventional process using only keyword information.

The operation of the third embodiment will now be described in greater detail, by way of example.

Except for the structural feature extracting section 110, the third embodiment is identical to the first embodiment, and therefore mainly the structural feature extracting section and the structural feature rule base 130 are described in the following.

FIG. 8 shows an example of the HTML document whose type is "link collection".

The structural feature rule base 130 stores the rule shown in FIG. 9. The basic form of the rule is "link: type: score: conditional expression." The first item is a label indicating that the rule matches the link feature extractor. The second item indicates a type of the rule, and the third item indicates a score. The fourth item indicates a conditional expression for a link.

For example, the rule "link: link collection: 4: 20>external>=10" means adding four points to the score of the type "link collection" when the number of links to external sites is above 10 and below 20. The variable "external" indicates the number of links to the external sites, and the variable "internal" indicates the number of links to internal sites. FIG. 9 shows the rules for the three types for "product catalog", "laboratory", and "link collection".

The structural feature extracting section 110 starts the link feature extractor 113, extracts link information from the HTML document, and sends the features to the verifier 120. For example, the thirteen underlined portions in the HTML document shown in FIG. 8 are extracted as external links. The verifier 120 verifies the features, which are sent from the structural feature extractor 110, according to the rule of the structural rule base 130.

The HTML document shown in FIG. 8 includes 21 external links and no internal links. A number of external and internal links are in fact included in the omitted middle portion of the document. Then, the verification according to the rule in FIG. 9 "link: link collection: 8: external>=20" is successful. According to the calculation process similar to the first embodiment, "product catalog" scores zero points, "laboratory" scores zero points, and "link collection" scores 8 points. That is, the relevance to "product catalog" is 0% (0/5×100), the relevance to "laboratory" is 0% (0/7×100), and the relevance to "link collection" is 57% (8/14×100).

[Fourth Embodiment]

The fourth embodiment of the present invention will be explained.

Figure 10:
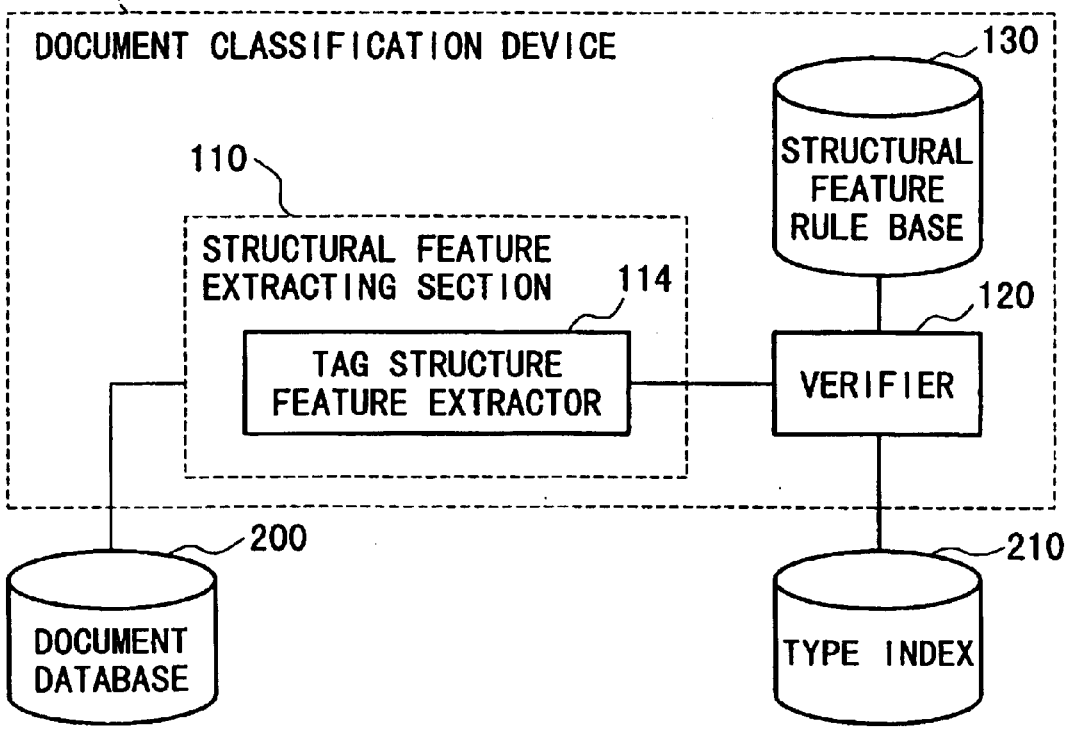
FIG. 10 is a block diagram showing the fourth embodiment of the present invention.

Referring to FIG. 10, as compared with the first embodiment, the fourth embodiment includes a tag structural feature extractor 114, which is provided in the structural feature extracting section 110, for extracting a tag feature from the HTML documents, instead of the keyword feature extractor 111.

In a manner similar to the first embodiment, the HTML document is input to the structural feature extracting section 110. The structural feature extracting section 110 starts the tag structural feature extractor 114, extracts tag structure information from the HTML document, and sends the information to the verifier 120. The structural feature rule base 130 stores a rule which defines conditions and scores for each type of document. The verifier 120 verifies the features, which are sent from the structural feature extracting section 110, according to the rules in the structural feature rule base 130. The verifier adds the points described in the rule, and calculates the relevance to each type of document. The verifier stores the calculation results in the type index 210.

According to the first embodiment, the structural feature extracting section extracts the tag information from the HTML document and determines the type of the document, allowing more detailed classification than that by the conventional process using only keyword information.

The operation of the fourth embodiment will now be described in greater detail, by way of example.

Except for the structural feature extracting section 110, the fourth embodiment is identical to the first embodiment, and therefore mainly the structural feature extracting section and the structural feature rule base 130 are described in the following.

FIG. 11 shows a portion of the HTML document whose type is "product catalog."

The structural feature rule base 130 stores a rule shown in FIG. 12. The basic form of the rule is "structure: type: score: tag: [conditional expression]." The first item is a label indicating that the rule matches the tag structural feature extractor. The second item indicates a type of the rule, and the third item indicates a score. The fourth item is a tag portion structure to be extracted, and the fifth item indicates a conditional expression for variables (%1, %2, ... ) in the tag structure or for the number (%n) of the tag structures. The fifth item is an option, and may not be necessarily filled when a conditional expression for the variables is unnecessary.

For example, the rule "structure: product catalog: 3: <table border=%1>:%1>=1" means adding three points to the score of "product catalog" when a <table> tag is found, a "border" attribute is detected, and the value of the "border" attribute is above 1. The rule "structure: product catalog: 2: <select>:" means adding one point to the score of "product catalog" when a "<select> tag is found. The rule "structure: product catalog: 3: <sup>: %n>=3" means adding three points to the score of "product catalog" when three <sup> tags are found. Thus, FIG. 9 shows rules for the three types for "product catalog", "laboratory", and "link collection."

The structural feature extracting section 110 starts the tag structural feature extractor 114, extracts tag structure information from the HTML document, and sends the tag features to the verifier 120. For example, the underlined portions in the HTML document shown in FIG. 11 are extracted as the <table> tag structure information and as the <sup>tag structure information. The verifier 120 verifies the features, which are sent from the structural feature extracting section 110, according to the rules in the structural feature rule base 130. The HTML document in FIG. 11 includes the <table> tag whose "border" value is 1 and four <sup> tags.

In the rules listed in FIG. 12, the verifications according to two rules described above are successful. Because this verification allows the partial match for the <table> tag, "<table border=1 width=100%>", extracted by the tag structural feature extractor 114, matches the condition in the rule "<table border=%1>". The rule may be a exact matching rule for detecting an item whose all attributes match the rule. An example of the verification using the exact matching rule is "structure: product catalog: 3: <table border=%1 width=%2>: %1>=1&%2>=50". This rule must describe the attribute "width". According to the calculation process similar to that in the first embodiment, "product catalog" scores 6 points, "laboratory" scores zero points, and "link collection" scores 2 points. The relevance to "product catalog" is 67% (6/9×100), the relevance to "laboratory" is 0% (0/1×100), and the relevance to "link collection" is 22% (2/9×100).

[Fifth Embodiment]

The fifth embodiment of the present invention will be explained.

Figure 13:
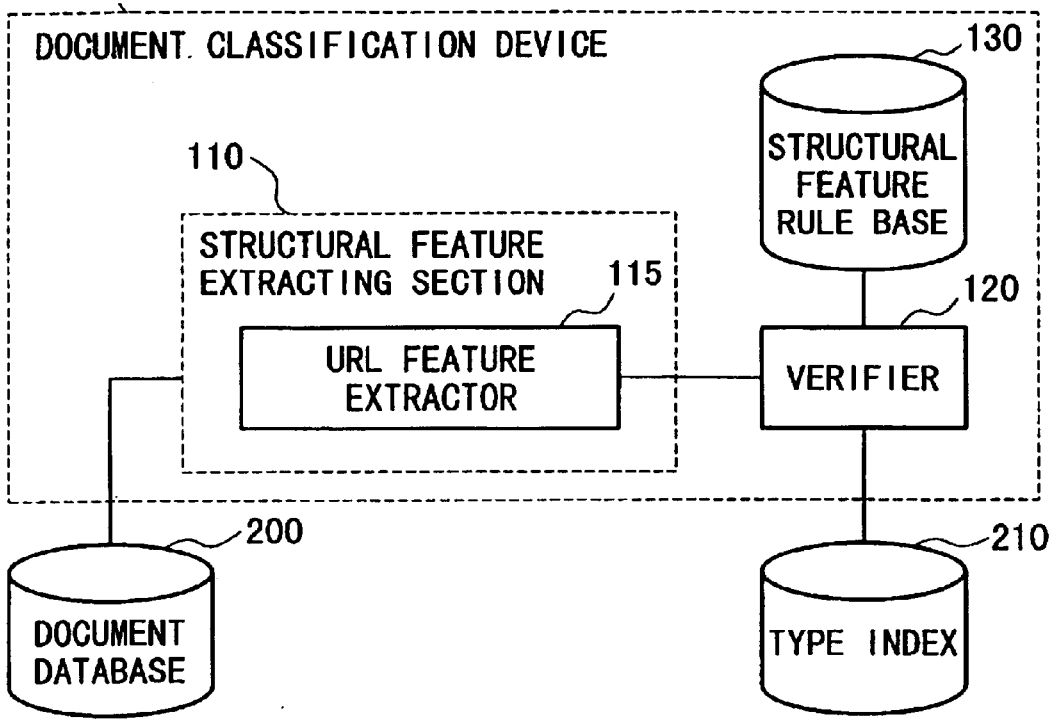
FIG. 13 is a block diagram showing the fifth embodiment of the present invention.

Referring to FIG. 13, as compared with the first embodiment, the fifth embodiment includes a URL feature extractor 115, which is provided in the structural feature extracting section 110, for extracting URL feature information from the HTML documents, instead of the keyword feature extractor 111.

In a manner similar to the first embodiment, the HTML document is input to the structural feature extracting section 110. The structural feature extracting section 110 starts the URL feature extractor 115, extracts the URL information of the HTML document, and sends it to the verifier 120. The structural feature rule base 130 stores a rule which defines conditions and scores for each type of document. The verifier 120 verifies the features, which are sent from the structural feature extracting section 110, according to the rules of the structural feature rule base 130. The verifier adds the corresponding scores described in the rule, and obtains the relevance to each type of document. The verifier stores the obtained results in the type index 210.

According to the fifth embodiment, the structural feature extracting section extracts the URL information of the HTML document and determines the type of the document, allowing more detailed classification than that by the conventional process using only keyword information.

The operation of the fifth embodiment will now be described in greater detail, by way of example.

Except for the structural feature extracting section 110, the fifth embodiment is identical to the first embodiment, and therefore mainly the structural feature extracting section and the structural feature rule base 130 are described in the following.

The structural feature rule base 130 includes the rule shown in FIG. 14. The basic form of this rule is "url: type: score: [conditional expression]." The first item is a label indicating that the rule matches the URL feature extractor. The second item indicates a type of the rule, and the third item indicates a score. The fourth item indicates a conditional expression for a URL character string.

For example, the rule "url: product catalog: 2: organization=co" means adding two points to the score of "product catalog" when the organization of the URL in the HTML document is a company (co). In addition to "organization", the variables "nation", "name", "path", and "file" are employed.

When the url is "http://www.ΔΔ.co.jp/Products/PC××NX/index.html", "ΔΔ" is bound to "name", "co" is bound to "organization", "jp" is bound to "nation", "Products/PC×× NX" is bound to "path", and "index.html" is bound to "file". Thus, FIG. 14 shows the rules for the three types, that is, "product catalog", "laboratory", and "link collection."

The structural feature extracting section 110 starts the URL structural feature extracting section 115, extracts the URL information of the HTML document, and sends it to the verifier 120. For example, when the URL of the HTML document is the example described above, the bound items are extracted as the URL information. The verifier 120 verifies the features, which are sent from the structural feature extracting section 110, according to the rules in the structural feature rule base 130. In the rules listed in FIG. 14, the verifications according to three rules are successful. According to the calculation process similar to that in the first embodiment, "product catalog" scores 8 points, "laboratory" scores zero points, and "link collection" scores zero points. The relevance to "product catalog" is 100% (8/8×100), the relevance to "laboratory" is 0% (0/2×100), and the relevance to "link collection" is 0% (0/10×100).

[Sixth Embodiment]

The sixth embodiment of the present invention will be explained.

Figure 15:
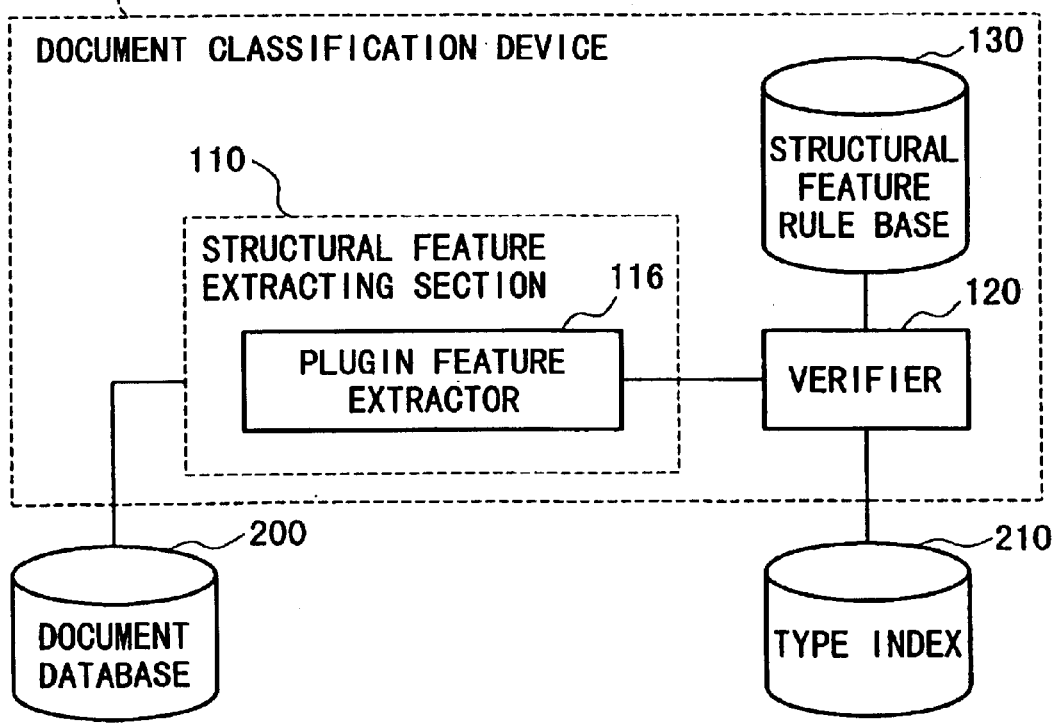
FIG. 15 is a block diagram showing the sixth embodiment of the present invention.

Referring to FIG. 15, as compared with the first embodiment, the sixth embodiment includes a plugin feature extractor 116, which is provided in the structural feature extracting section 110, for extracting a plugin information from the HTML documents, instead of the keyword feature extractor 111.

In a manner similar to the first embodiment, the HTML document is input to the structural feature extracting section 110. The structural feature extracting section 110 starts the plugin feature extractor 116, extracts the plugin information from the HTML document, and sends it to the verifier 120. The structural feature rule base 130 stores a rule which defines conditions and scores for each type of document. The verifier 120 verifies the features, which are sent from the structural feature extracting section 110, according to the rules of the structural feature rule base 130. The verifier adds the corresponding scores described in the rule, and obtains the relevance to each type of document. The verifier stores the obtained results in the type index 210.

According to the present invention, the structural feature extracting section extracts the plugin information from the HTML document and determines the type of the document, allowing more detailed classification than that by the conventional process using only keyword information.

The operation of the sixth embodiment will now be described in greater detail, by way of example.

Except for the structural feature extracting section 110, the sixth embodiment is identical to the first embodiment, and therefore mainly the structural feature extracting section and the structural feature rule base 130 are described in the following.

FIG. 16 shows an example of the HTML document whose type is "game."

The structural feature rule base 130 stores a rule shown in FIG. 17. The basic form of the rule is "plugin: type: score: [conditional expression]." The first item is a label indicating that the rule matches the tag structural feature extractor. The second item indicates a type of the rule, and the third item indicates a score. The fourth item indicates a conditional expression to determine the type of the plugin.

For example, the rule "plugin: game: 3: type=swf" means adding 3 points to the score of the type "game" when the type of the plugin source is Shockwave Flash (swf) (the trademark of Macromedia, Inc.). FIG. 17 describes the rules for the three types for "game", "product catalog", and "personal page."

The structural feature extracting section 110 starts the plugin structural feature extracting section 116, extracts the plugin information of the HTML document, and sends it to the verifier 120. For example, in the HTML document in FIG. 16, the underlined portions are extracted as the plugin information. The verifier 120 verifies the features, which are sent from the structural feature extracting section 110, according to the rules in the structural feature rule base 130. In the rules listed in FIG. 17, the verifications according to the rules at lines 1 and 7 are successful. According to the calculation process similar to that in the first embodiment, "game" scores 3 points, "product catalog" scores zero points, and "personal page" scores 3 points. The relevance to "game" is 60% (3/5×100), the relevance to "product catalog" is 0% (0/10×100), and the relevance to "personal page" is 38% (3/8×100).

[Seventh Embodiment]

The seventh embodiment of the present invention will be explained.

Figure 18:
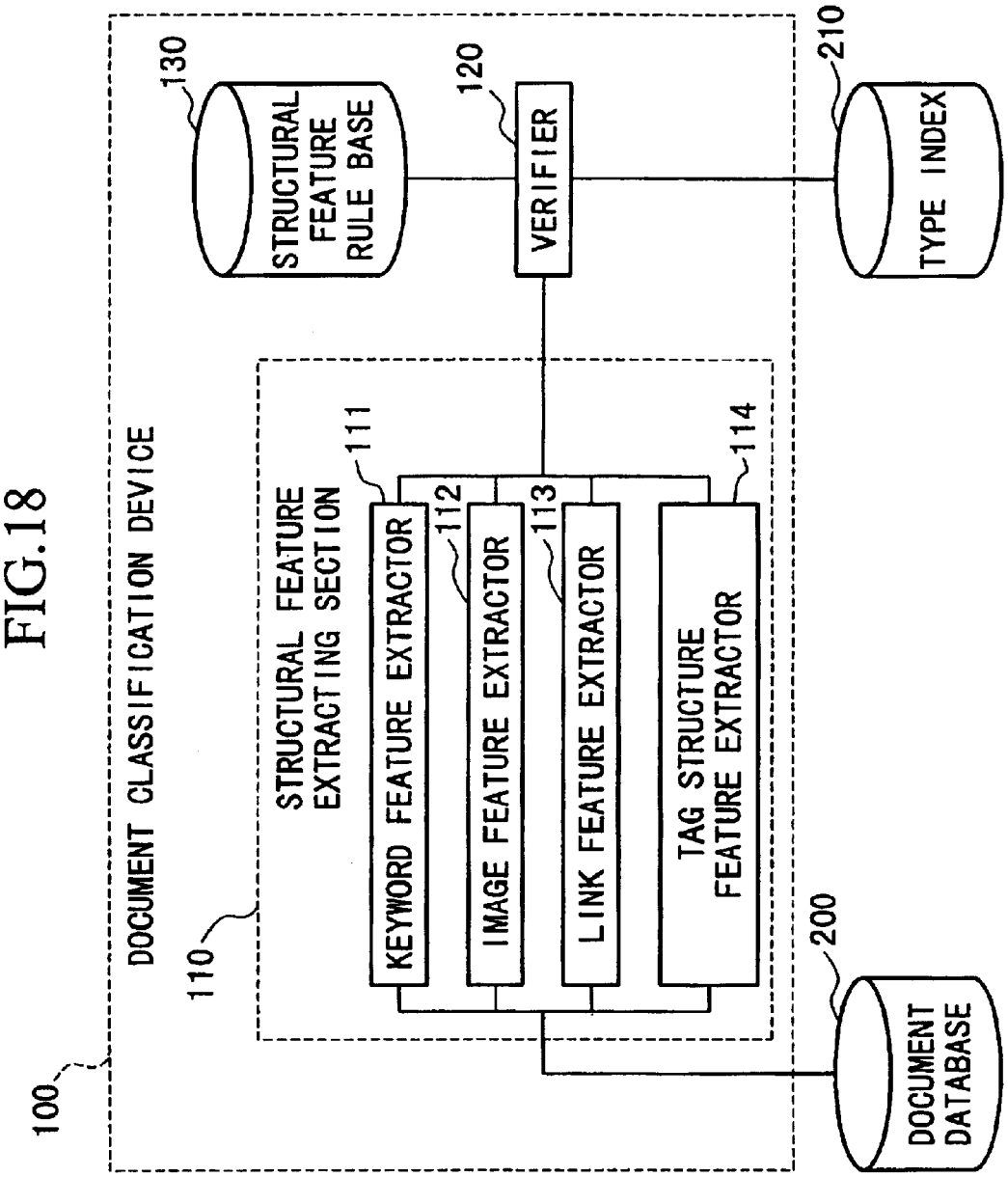
FIG. 18 is a block diagram showing the seventh embodiment of the present invention.

Referring to FIG. 18, as compared with the first embodiment, the structural feature extracting section 110 further comprises an image feature extractor 112, a link feature extractor 113, and a tag structural feature extractor 114.

In a manner similar to the first embodiment, the HTML document is input to the structural feature extracting section 110. The structural feature extracting section 110 starts the keyword feature extractor 111, the image feature extractor 112, the link feature extractor 113, and the tag structural feature extractor 114, extracts various information from the HTML document, and sends it to the verifier 120. The structural feature rule base 130 stores a rule which defines conditions and scores for each type of document. The verifier 120 verifies the features, which are sent from the structural feature extracting section 110, according to the rules of the structural feature rule base 130. The verifier adds the corresponding scores described in the rule, and obtains the relevance to each type of document. The verifier stores the obtained results in the type index 210.

According to the seventh embodiment, the structural feature extracting section extracts the various information from the HTML document and determines the type of the document, allowing more detailed classification than that by the conventional process using only keyword information.

The operation of the seventh embodiment will now be described in greater detail, by way of example.

Except that the structural feature extracting section 110 further comprises the image feature extractor 112, the link feature extractor 113, and the tag structure extractor 114, the seventh embodiment is identical to the first embodiment, and therefore mainly the structural feature extracting section and the structural feature rule base 130 are described in the following.

The rules in the structural feature rule base 130 are shown in FIG. 19. The forms of the rules are identical to the forms in the first, second, third, and fourth embodiments.

The structural feature extracting section 110 starts the keyword feature extractor 111, the image feature extractor 112, the link feature extractor 113, and the tag structural feature extractor 114, extracts various information, of which the feature extractors control, from the HTML document, and sends it to the verifier 120. The verifier 120 verifies the features, which are sent from the structural feature extracting section 110, according to the rules of the structural feature rule base 130.

While in the seventh embodiment the structural feature extracting section 110 includes the keyword feature extractor 111, the image feature extractor 112, the link feature extractor 113, and the tag feature extractor 114, one or some of the feature extractors 111 to 116 may be combined in the structural feature extracting section 110.

[Eighth Embodiment]

The eight embodiment of the present invention will be explained.

Figure 20:
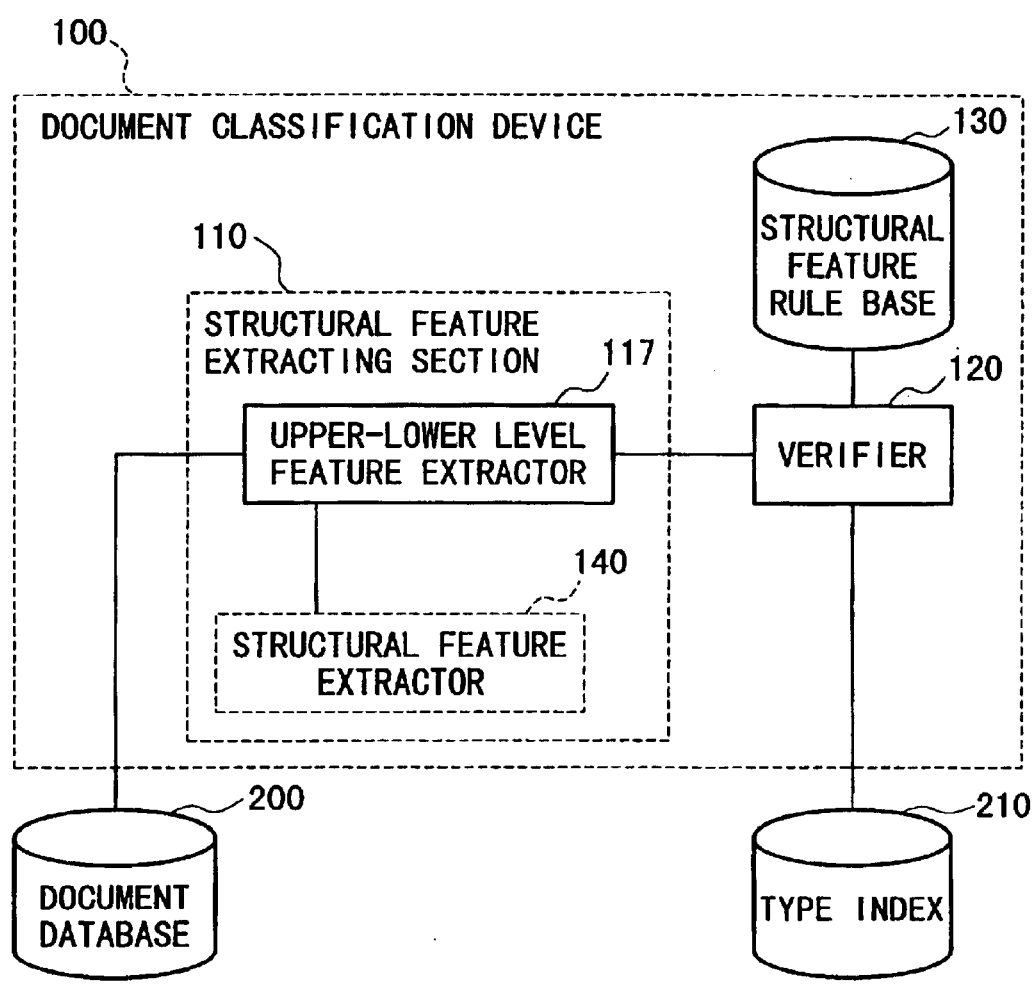
FIG. 20 is a block diagram showing the eighth embodiment of the present invention.

Referring to FIG. 20, as compared with the first embodiment, the structural feature extractor 110 in the eighth embodiment includes an upper-lower level feature extractor 117 for extracting features of HTML documents which are linked with the target HTML document and of HTML documents with which the target HTML document is linked, instead of the keyword feature extractor 111. The structural feature extractor 110 includes another structural feature extractor 140 which is started through the upper-lower level feature extractor 117.

In a manner similar to the first embodiment, the HTML document is input to the structural feature extracting section 110. The structural feature extracting section 110 starts the upper-lower level feature extractor 117, extracts the information of the upper level documents (the HTML documents linked with the target HTML document) and of the lower level document (the HTML documents with which the target HTML document is linked), and sends the information to the verifier 120. To extract the structural features from the upper- and lower-level documents, the upper-lower level extracting section 117 starts the structural feature extracting section 140 which is identical to one of the structural feature extracting sections 110 in the first to seventh embodiments. The structural feature rule base 130 stores a rule which defines conditions and scores for each type of document. The verifier 120 verifies the features, which are sent from the structural feature extracting section 110, according to the rules in the structural feature rule base 130. The verifier 120 adds the scores described in the rule, and obtains relevance of the document to each type. The calculated results are stored in the type index 210.

According to the eighth embodiment, the structural feature extracting section extracts the information of the upper and lower level documents and determines the type of the document, allowing more detailed classification than that by the conventional process using only keyword information.

The operation of the eighth embodiment will now be described in greater detail, by way of example.

Except for the structural feature extracting section 110, the eighth embodiment is identical to the first embodiment, and therefore mainly the structural feature extracting section and the structural feature rule base 130 are described in the following.

The structural feature rule base 130 includes the rule shown in FIG. 21. The basic form of this rule is "relation: type: score: up-down: rule." The first item is a label indicating that the rule matches the upper-lower level feature extractor. The second item indicates a type of the rule, and the third item indicates a score. The fourth item indicates which upper or lower document is to be extracted. The fifth item is a rule depending on the feature extractor in the structural feature extracting section 140, but the rule does not include "type" and "score."

For example, the rule "relation: product catalog: 5: up: keyword: <a>: specification | spec." means adding 5 points to the score of "product catalog" when a "<a>" tag in the upper level document includes the keywords "specification" or "spec." FIG. 21 describes the rules of the three types for "product catalog", "laboratory", and "link collection."

The structural feature extracting section 110 starts the upper-lower level feature extractor 117, which then starts the structural feature extracting section 140. The structural feature extracting section 110 collects the features obtained from the feature extractors in the structural feature extracting section 140, and sends them to the verifier 120. Supposing that the structural feature extracting section 140 includes the keyword feature extractor 111, the image feature extractor 112, the link feature extractor 113, and the tag structural feature extractor 114, the rule of FIG. 21 is prepared.

The verifier 120 verifies the features, which are sent from the structural feature extracting section 110, according to the rules in the structural feature rule base 130. While in this embodiment the keyword feature extractor 111, the image feature extractor 112, the link feature extractor 113, and the tag structural feature extractor 114 are combined in the structural feature extracting portion 140, any or all of the feature extractors 111 to 116 may be combined.

[Ninth Embodiment]

The ninth embodiment of the present invention will be explained.

Figure 22:
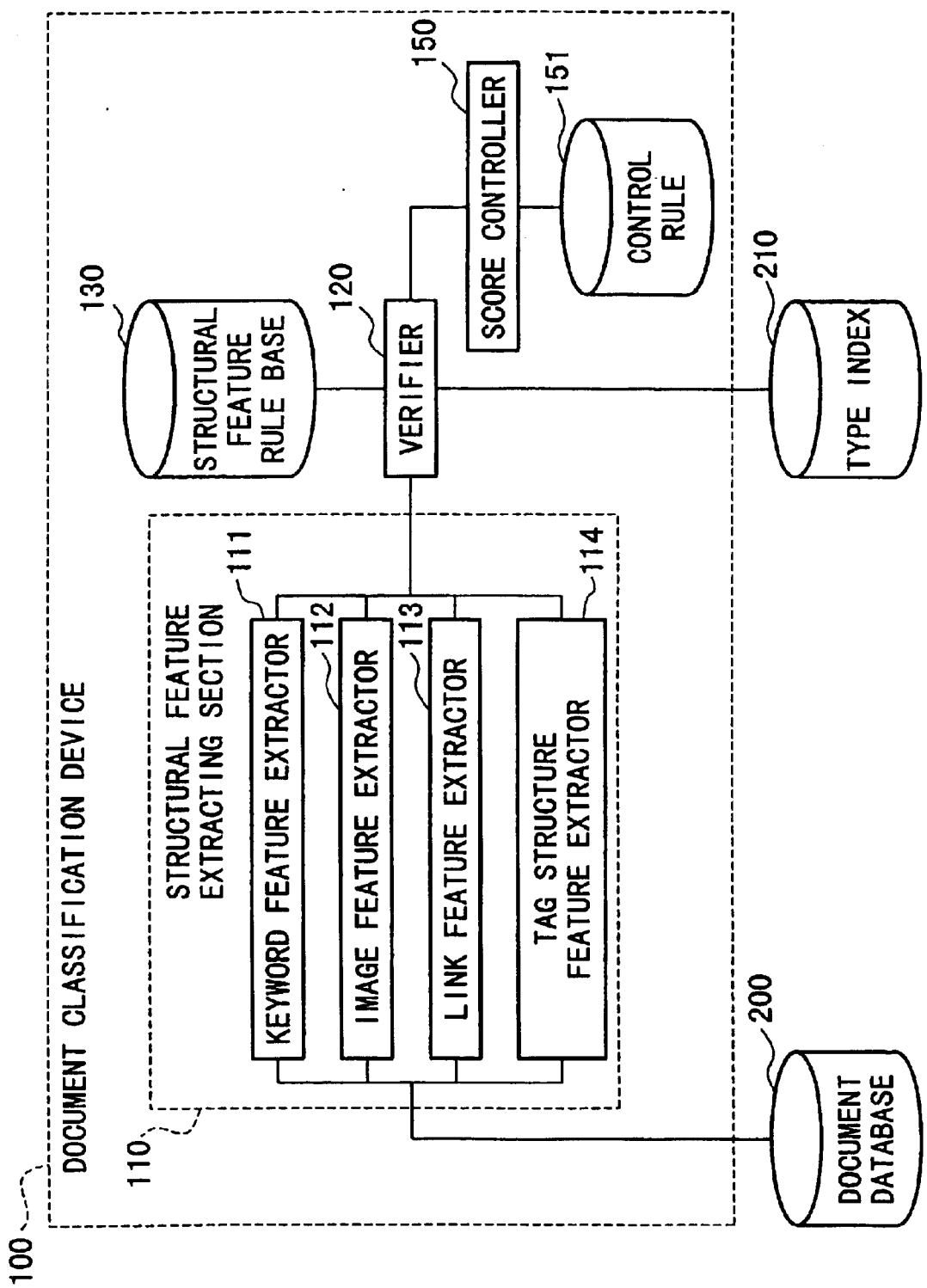
FIG. 22 is a block diagram showing the ninth embodiment of the present invention.

Referring to FIG. 22, as compared with the seventh embodiment, the ninth embodiment includes a score controller 150 for performing fine control of the relevance calculated by the verifier 120 based on a control rule 151.

In a manner similar to the seventh embodiment, the verifier 120 calculates the relevance to the types. Then, the score controller 150 performs the fine control for the relevance to the types according to control rules 151 in consideration of the relationships between the types and of the whole situation. The relevance to the types controlled by the score controller 150 are stored in the type index 210.

According to the ninth embodiment, the determination results, that is, relevance of the type of the HTML document made by the structural feature extracting section 110 and the structural feature rule base 130, are finely controlled in consideration of the relationships between the types and of the whole situation, allowing more detailed classification than that by the conventional process using only keyword information.

Except for the score controller 150 and the control rule 151, the ninth embodiment is identical to the seventh embodiment, and therefore mainly the verifier 120, the score controller 150, and the control rule 151 are described in the following.

An example of the control rule 151 is shown in FIG. 23. The first control rule in FIG. 23 is an "if-then" form in which "if" represents a condition and "then" represents execution. For example, the rule at line 1 in FIG. 23 means increasing the relevance to "product catalog" by 10% and reducing the relevance to "personal page" by 10% when the difference between the relevance to "product catalog" and "personal page" is equal to or above 0% and equal to or below 10%, when the relevance to "persona page" is equal to or above 0%, and when the relevance to "product catalog" is equal to or below 90%. In FIG. 23, "max", "min", and "ave" are variable. "Max" represents a type showing the highest relevance, "min" represents a type showing the lowest relevance, and "ave" represents the average of all relevances of the types. The fourth control rule in FIG. 23 means increasing the highest relevance of the type by 20% when the highest relevance is equal to or below 30% and when the average of the relevances is equal to or below 20%.

The verifier 120 stores the scores, which are controlled by the score controller 150, in the type index 210.

[Tenth Embodiment]

The tenth embodiment of the present invention will be explained.

Figure 24:
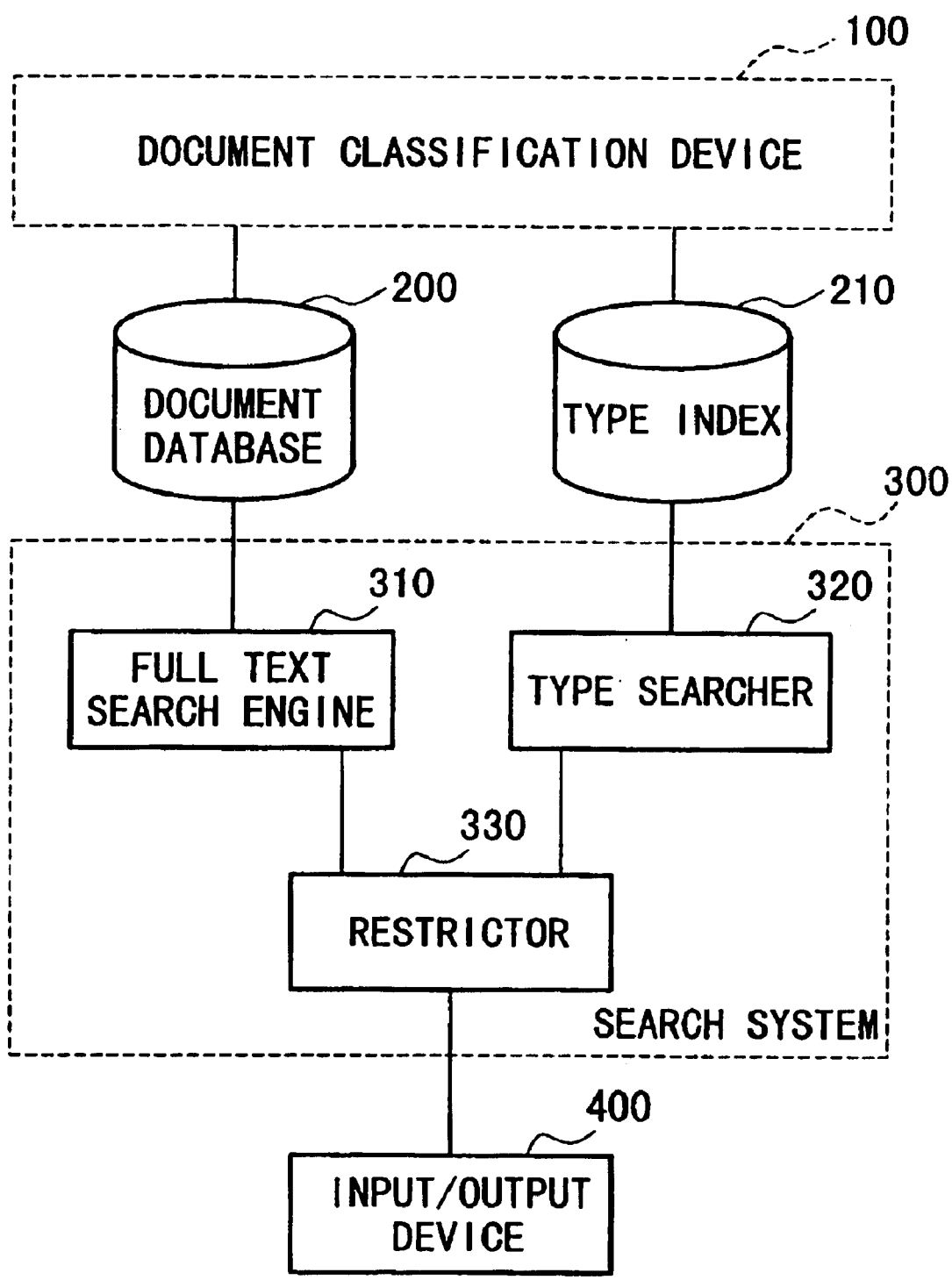
FIG. 24 is a block diagram showing the tenth embodiment of the present invention.

Referring to FIG. 24, as compared with the first embodiment, the tenth embodiment further comprises a document classifier 100, a document data base 200, a type index 210, a searcher 300, and an input/output device 400.

The document classifier 100 may be one of the first to ninth embodiments. The searcher 300 comprises a full text search engine 310 for performing a search in the document database 200 by a keyword, a type searcher 320 for finding the relevance of a document to each type, a restrictor 330 for starting the full text search engine 310 and the type searcher 320 by a keyword and a type input from the input/output device 400, and for restricting the search results.

The document classifier 100 calculates the relevance of all HTML documents in the document database 200 to the types, and the type index 210 stores the relevance with the same IDs as the HTML documents. From the input/output device 400, a keyword and a type are sent to the restrictor 330. The restrictor 330 sends the keyword to the full text search engine 310. The full text search engine 310 performs the full text search in the document database 200, and sends the IDs of the HTML documents matching the keyword to the restrictor 330. The restrictor 330 sends the IDs and types of the HTML documents to the type searcher 320. Based on the IDs and types of the HTML documents, the type searcher 320 performs a search of the relevance of the documents to the types, and sends the results to the restrictor 330. The restrictor 330 sends the search results to the input/output device 400.

According to the tenth embodiment, the document classifier classifies the documents by types, and the full text search engine narrows the enormous search results based on the index and indicates the narrowed results, allowing a user to find a target HTML document easily.

The operation of the tenth embodiment will now be described in greater detail, by way of example.

For example, the document database 200 stores 1,000,000 HTML documents. The ID numbers 1 to 1,000,000 are assigned to the HTML documents. The document classifier 100 has calculated the relevance to seven types and stores the relevance in the type index 210 beforehand.

FIG. 25 shows a part of the type index 210. From the input/output device 400, a user inputs, for example, a keyword "mobile xx" and a type "product catalog". The restrictor 330 sends the keyword "mobile xx" to the full text search engine 310. The full text search engine 310 performs the full text search in the document database 200, and obtains results which include, for example, 10,000 documents. While in this embodiment the full text search engine is used to make a search in the HTML documents, the present invention is not limited to this, and may perform a search by sample phrases, example sentences, and similar documents. The restrictor 330 sends the IDs of the 10,000 HTML documents and the type "product catalog" to the type searcher 320.

The type searcher 320 consults the type index 210 by the IDs, and obtains the relevance to the type "product catalog" from the records of the product catalog fields. For example, when the ID of the HTML document shown in FIG. 25 is 2, the relevance to "product catalog" is 88%.

The restrictor 330 returns the ID of the HTML document, whose relevance is above a threshold value, to the input/output device 400. When the threshold value is above 80%, there are three HTML documents 2, 6, and 11 whose relevance to "product catalog" is above 80%. When the full text search engine 310 performs the full text search through the documents of IDs 1 to 17 by the keyword "mobile xx", a conventional search system having only the full text search engine may display the results which include 17 documents, but the present invention narrows the results to the three documents. When, for example, the type index 210 as shown in FIG. 25, in which three documents are chosen from 17 documents, is applied to all the documents, the search can narrows the 10,000 documents to approximately 1765 documents. While in the embodiment the threshold value is above 80%, the threshold value may be changed depending on the circumstances. While the embodiment ignores the documents below the threshold value, the 17 documents may be displayed according to the order from the highest relevance to the lowest relevance.

[Eleventh Embodiment]

The eleventh embodiment will be explained with reference to Figures.

Figure 26:
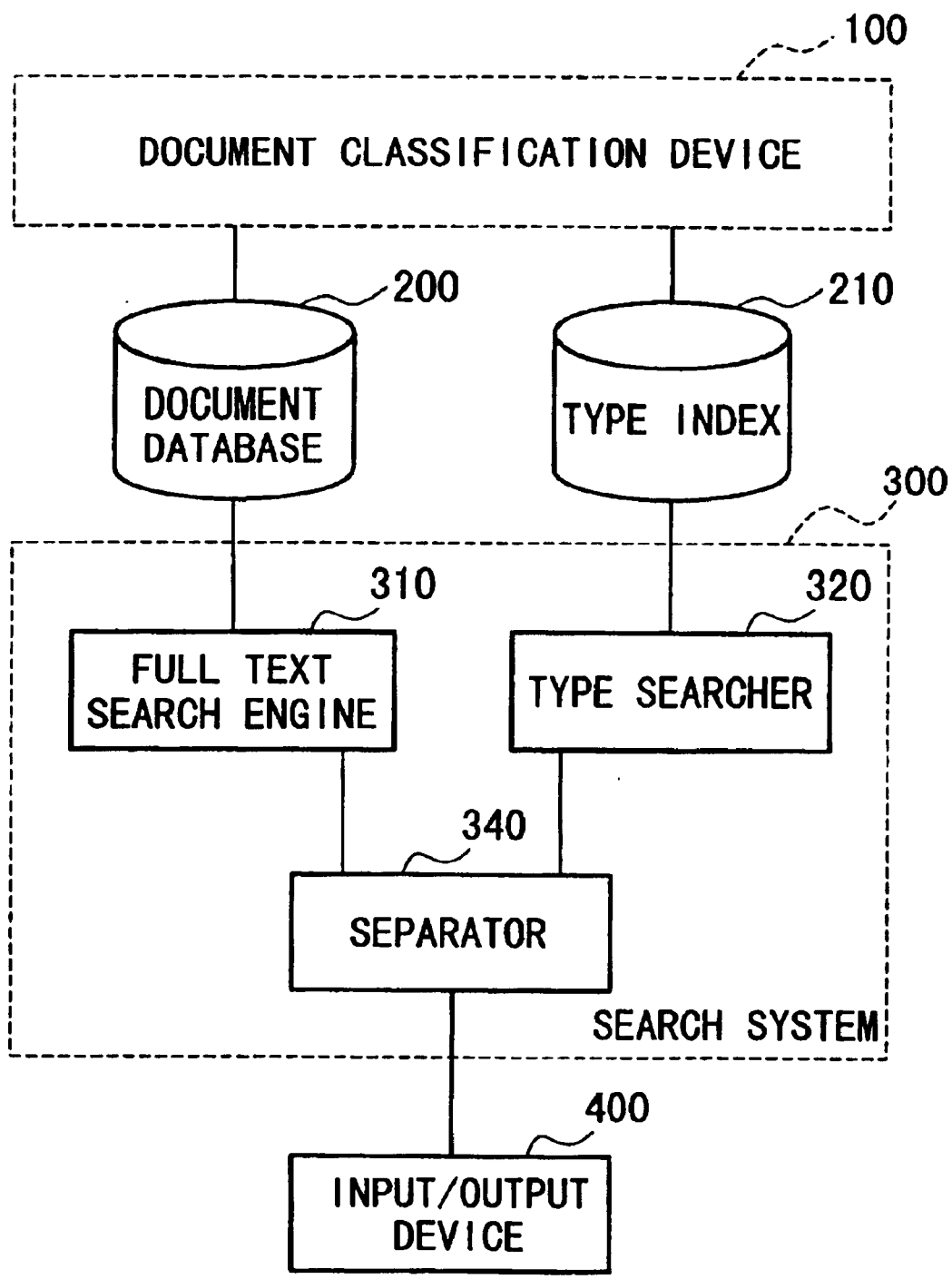
FIG. 26 is a block diagram showing the eleventh embodiment of the present invention.

Referring to FIG. 26, the eleventh embodiment has a separator 340 for separating the search results by types, instead of the restrictor 330 in the tenth embodiment.

The input/output device 400 sends a keyword to the separator 340. The separator 340 sends the keyword to the full text search engine 310. The full text search engine 310 performs a full text search, and sends the IDs of the HTML document matching the keyword to the separator 340. The separator 340 sends the IDs of the HTML documents to the type searcher 320. The type searcher 320 finds the relevance to each type based on the IDs of the HTML documents, and sends the results back to the separator 340. The separator 340 determines which type has the highest relevance in each HTML document, groups all the HTML documents by the type of the highest relevance, and sends the search results to the input/output device 400.

According to the eleventh embodiment, the document classifier classifies the documents by types, and the full text search engine narrows the enormous search results based on the index and indicates the narrowed results, allowing a user to find a target HTML document easily.

The operation of the first embodiment will now be described in greater detail, by way of example.

The document database 200 and the type index 210 include the contents identical to those in the tenth embodiment.

From the input/output device 400, the user inputs, for example, a keyword "mobile xx". The separator 340 sends the keyword "mobile xx" to the full text search engine 310. The full text search engine 310 performs the full text search in the document database 200, and obtains the search results which include 10,000 hits.

The separator 340 sends the IDs of the 10,000 HTML documents to the type searcher 320, determines which type has the highest relevance in each HTML document, and groups all the HTML documents by the type of the highest relevance. In FIG. 25, the HTML document whose ID is 1 is classified as "product catalog", and the HTML document whose ID is 3 is classified as "laboratory."

The grouped search results are sent back to the input/output device 400 for display to the user.

While in this embodiment all the HTML documents are grouped by the seven types, the HTML documents whose highest relevance are below 50% may be classified into a group "other" on the display.

Figure 27:
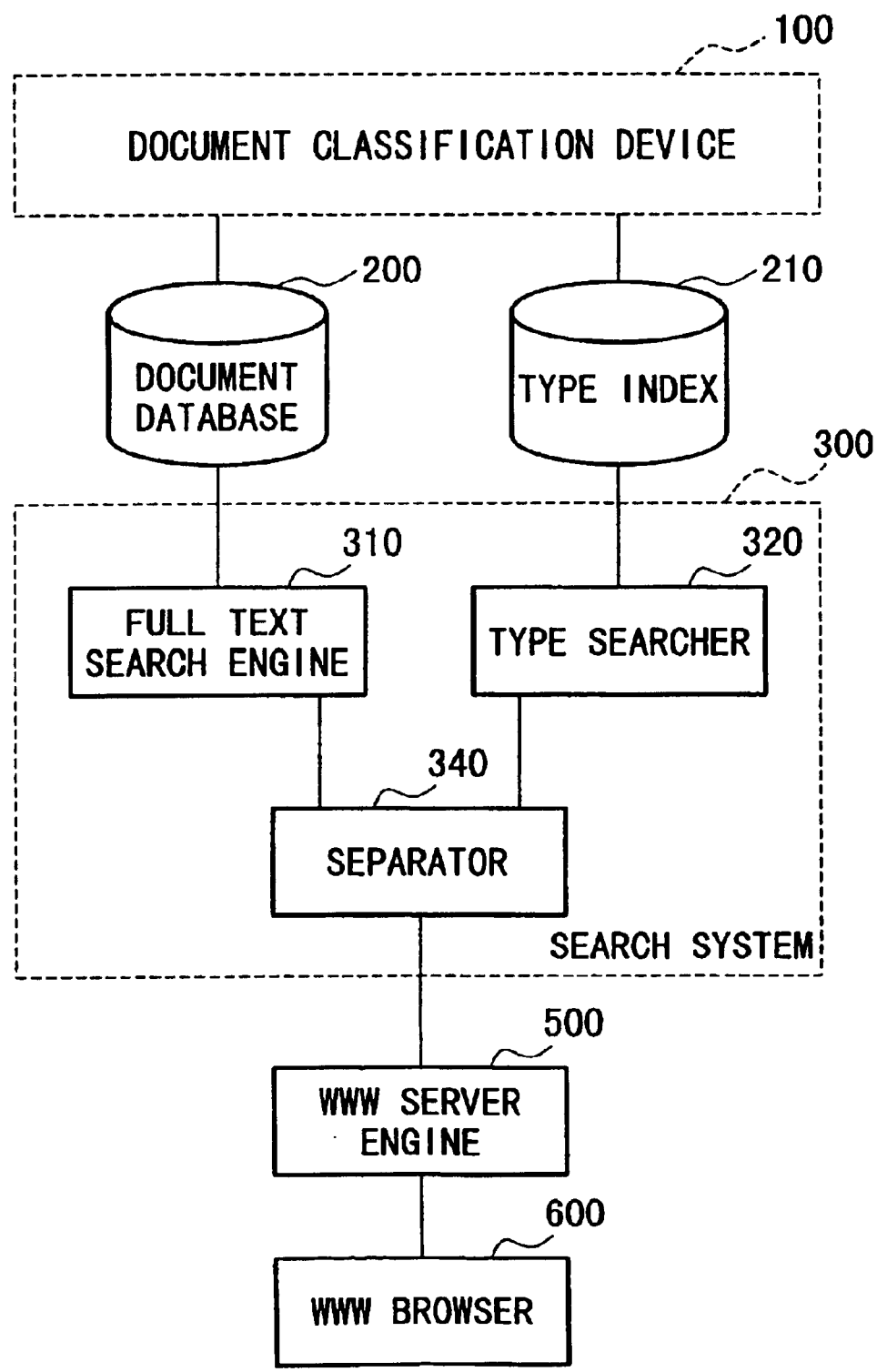
FIG. 27 is a block diagram showing a modification of the eleventh embodiment of the present invention.

As shown in FIG. 27, a WWW server engine 500 may be provided instead of the input/output device 400, and a www browser 600 may allow the data input/output. The WWW server engine 500 and the WWW browser 600 may be provided in the tenth embodiment.

The embodiments described above may be provided by computer programs. In the inventions of the first to ninth embodiments, the document classifier 100 may be achieved by a computer-readable memory recording the programs which includes computer instructions. In the tenth and eleventh embodiments, the search engine 300 may be provided by a computer-readable memory recording the program which includes computer instructions.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A structured document classification device for classifying structured documents by types, comprising:

a structural feature extracting section for extracting a structural feature or an incidental feature from each of said structured documents;

a structural feature rule base for storing a rule dedicated to the extracted structural feature or the extracted incidental feature; and a verifier for verifying each feature, which is extracted by said structural feature extracting section, said verifier performing said verifying according to the rule stored in said structural feature rule base, and said verifier calculating relevance to each of said types, and wherein said structural feature extracting section includes a keyword feature extractor for extracting a tag and keyword pair from each structured document as the structural feature or incidental feature.

2. A device according to claim 1, wherein said structural feature extracting section includes a image file feature extractor for extracting a feature of an image file from each structured document as the structural feature or incidental feature.

3. A device according to claim 1, wherein said structural feature extracting section includes a link feature extractor for extracting a feature of a link from each structured document as the structural feature or incidental feature.

4. A device according to claim 1, wherein said structural feature extracting section includes a tag structural feature extractor for extracting a feature of a tag structure from each structured document as the structural feature or incidental feature.

5. A device according to claim 1, wherein said structural feature extracting section includes a URL feature extractor for extracting a feature of URL information from each structured document as the structural feature or incidental feature.

6. A device according to claim 1, wherein said structural feature extracting section includes a plugin feature extractor for extracting a feature of a plugin from each structured document as the structural feature or incidental feature.

7. A device according to claim 1, wherein said structural feature extracting section includes a upper-lower level feature extractor for extracting structural features of an upper level document and of a lower level document from each structured document as the structural feature or incidental feature.

8. A device according to claim 1, wherein said structural feature extracting section extracts any combination of features of a tag and keyword pair, an image file, a link, a tag structure, URL information, and a plugin as the structural features or incidental features.

9. A device according to claim 1, further comprising:
a score controller for controlling the relevance of each structured document according to a control rule which finely controls the relevance in consideration of relationships between the types and of the context as a whole.

10. A structured document search system using the structured document classification device according to claim 1, comprising:
a input/output device for inputting a search parameter and a type of a target structured document and for outputting search results;
a search engine for performing a search in a database storing structured documents by the input search parameter;
a type searcher for searching for the relevance to the input type of the structured documents found by said search engine, the relevance being calculated by said structured document classification device; and
a restrictor for receiving the search results from said search engine, receiving the relevance of the structured document found by said type searcher, narrowing the search results by consulting the relevance to the input type, and outputting the narrowed search results to said input/output device.

11. A structured document search system using the structured document classification device according to claim 1, comprising:
a input/output device for inputting a search parameter and a type of a target structured document and for outputting search results;
a search engine for performing a search in a database storing structured documents by the input search parameter;
a type searcher for searching for the relevance to the input type of the structured documents found by said search engine, the relevance being calculated by said structured document classification device; and
a separator for receiving the search results from said search engine, receiving the relevance of the structured document found by said type searcher, grouping the found documents according to their relevance to the input type, and outputting the search results to said input/output device.

12. A computer-readable memory containing computer-readable instructions for classifying structured documents by types, comprising:
extracting a structural feature or an incidental feature from each of said structured documents;
verifying each feature according to a rule dedicated to the extracted structural feature or the extracted incidental feature; and
calculating relevance to each of said types, wherein said verifying and said calculating are performed in a verifier, and
wherein the computer-readable instructions comprises extracting a tag and keyword pair from each structured document as the structural feature or incidental feature.

13. A computer-readable memory according to claim 12, wherein the computer-readable instructions comprises extracting a feature of an image file from each structured document as the structural feature or incidental feature.

14. A computer-readable memory according to claim 12, wherein the computer-readable instructions comprises extracting a feature of a link from each structured document as the structural feature or incidental feature.

15. A computer-readable memory according to claim 12, wherein the computer-readable instructions comprises extracting a feature of a tag structure from each structured document as the structural feature or incidental feature.

16. A computer-readable memory according to claim 12, wherein the computer-readable instructions comprises extracting a feature of URL information from each structured document as the structural feature or incidental feature.

17. A computer-readable memory according to claim 12, wherein the computer-readable instructions comprise extracting a feature of a plugin from each structured document as the structural feature or incidental feature.

18. A computer-readable memory according to claim 12, wherein the computer-readable instructions comprise extracting structural features of an upper level document and of a lower level document from each structured document as the structural feature or incidental feature.

19. A computer-readable memory according to claim 12, wherein the computer-readable instructions comprises extracting any combination of features of a tag and keyword pair, an image file, a link, a tag structure, URL information, and a plugin as the structural features or incidental features.

20. A computer-readable memory according to claim 12, wherein the computer-readable instructions comprises controlling the relevance of each structured document according to a control rule which finely controls the relevance in consideration of relationships between the types and of the context as a whole.

21. A computer-readable memory containing computer-readable instructions, comprising:
calculating the relevance of structured documents using a computer-readable memory according to claim 12;
inputting a search parameter and a type of a target structured document and outputting search results through an input/output device;
performing a search in a database storing structured documents by the input search parameter by a search engine;
searching for the relevance to the input type of the structured documents found by said search engine; and
receiving the search results from said search engine, receiving the relevance of the structured document found by said type searcher, narrowing the search results by consulting the relevance to the input type, and outputting the narrowed search results to said input/output device.

22. A computer-readable memory containing computer-readable instructions, comprising:
calculating relevance of structured documents using a computer-readable memory according to claim 12;
inputting a search parameter and a type of a target structured document and outputting search results through an input/output device;
performing a search in a database storing structured documents by the input search parameter by a search engine;

searching for the relevance to the input type of the structured documents found by said search engine; and receiving the search results from said search engine, receiving the relevance of the structured document found by said type searcher, grouping the found documents according to their relevance to the input type, and outputting the search results to said input/output device.

\* \* \* \* \*